US010664101B2

(12) United States Patent
Files et al.

(10) Patent No.: US 10,664,101 B2
(45) Date of Patent: May 26, 2020

(54) INFORMATION HANDLING SYSTEM TOUCH DEVICE FALSE TOUCH DETECTION AND MITIGATION

(71) Applicant: Dell Products L.P., Round Rock, TX (US)

(72) Inventors: Jace W. Files, Round Rock, TX (US); Yagiz Can Yildiz, Austin, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/021,655

(22) Filed: Jun. 28, 2018

(65) Prior Publication Data
US 2020/0004377 A1    Jan. 2, 2020

(51) Int. Cl.
G06F 3/041     (2006.01)
G06F 3/044     (2006.01)
G06F 3/038     (2013.01)
G06F 3/0488    (2013.01)
G06F 3/0354    (2013.01)

(52) U.S. Cl.
CPC .......... G06F 3/0418 (2013.01); G06F 3/038 (2013.01); G06F 3/03548 (2013.01); G06F 3/044 (2013.01); G06F 3/0488 (2013.01); G06F 2203/04106 (2013.01)

(58) Field of Classification Search
CPC .. G06F 3/0418; G06F 3/0488; G06F 3/03548; G06F 3/044; G06F 3/038; G06F 2203/04106
See application file for complete search history.

(56) References Cited

U.S. PATENT DOCUMENTS

| 6,134,661 A | 10/2000 | Topp |
| 6,297,804 B1 | 10/2001 | Kashitani |
| 6,504,530 B1 | 1/2003 | Wilson et al. |
| 6,614,422 B1 | 9/2003 | Rafii et al. |
| 7,252,394 B1 | 8/2007 | Fu |
| 7,692,667 B2 | 4/2010 | Nguyen et al. |
| 8,228,315 B1 | 7/2012 | Starner et al. |
| 8,321,810 B2 | 11/2012 | Henitze |
| 8,531,352 B2 | 9/2013 | Zeng et al. |
| 8,958,158 B1 | 2/2015 | Raffle et al. |

(Continued)

FOREIGN PATENT DOCUMENTS

FR    2994751 A1    2/2014
WO    WO 2016155887    10/2016

OTHER PUBLICATIONS

Celluon, Magic Cube, printed Aug. 24, 2015 http://www.celluon.com/products_epic_overview.php.

(Continued)

Primary Examiner — Aneeta Yodichkas
(74) Attorney, Agent, or Firm — Zagorin Cave LLP; Robert W. Holland

(57) ABSTRACT

Detection and tracking of a totem by a touchscreen touch controller mitigates false touches and false inputs by adapting capacitance at the totem feet. Totem feet have a capacitance that falls between a noise threshold and a finger touch threshold so that a pattern of the totem feet is detected separate from finger touches. Active capacitance is applied to one or more of the totem feet to enhance totem detection, such as by highlighting totem contact points of interest to an end user for a rotational versus linear input.

9 Claims, 21 Drawing Sheets

(56) References Cited

U.S. PATENT DOCUMENTS

| | | |
|---|---|---|
| 9,348,420 B2 | 5/2016 | Krishnakumar et al. |
| 9,557,835 B2 | 1/2017 | Bigand |
| 9,690,400 B2 | 6/2017 | Krishnakumar et al. |
| 9,778,778 B2 | 10/2017 | Helmes et al. |
| 9,958,959 B2 | 5/2018 | Dietz |
| 10,289,216 B2 | 5/2019 | Danglard |
| 2002/0075240 A1 | 6/2002 | Lieberman et al. |
| 2003/0126317 A1 | 7/2003 | Chang |
| 2003/0132921 A1 | 7/2003 | Torunoglu et al. |
| 2004/0049462 A1 | 3/2004 | Wang |
| 2004/0100479 A1 | 5/2004 | Nakano et al. |
| 2004/0267995 A1 | 12/2004 | Peng |
| 2005/0024606 A1 | 2/2005 | Li et al. |
| 2005/0141752 A1 | 6/2005 | Bjorgan et al. |
| 2005/0225538 A1 | 10/2005 | Verhaegh |
| 2005/0254453 A1 | 11/2005 | Barneah |
| 2005/0264987 A1 | 12/2005 | Krancher et al. |
| 2005/0281475 A1 | 12/2005 | Wilson |
| 2006/0007179 A1 | 1/2006 | Pihlaja |
| 2006/0092170 A1 | 5/2006 | Bathiche et al. |
| 2006/0139714 A1 | 6/2006 | Gruhike et al. |
| 2006/0244719 A1 | 11/2006 | Brigham |
| 2006/0256090 A1 | 11/2006 | Huppi |
| 2007/0035521 A1 | 2/2007 | Jui et al. |
| 2007/0058879 A1 | 3/2007 | Cutler et al. |
| 2007/0270213 A1 | 11/2007 | Nguyen et al. |
| 2007/0279401 A1 | 12/2007 | Ramstein |
| 2008/0231611 A1 | 9/2008 | Bathiche et al. |
| 2008/0238879 A1 | 10/2008 | Jaeger |
| 2009/0077504 A1 | 3/2009 | Bell et al. |
| 2009/0168027 A1 | 7/2009 | Dunn et al. |
| 2009/0184962 A1 | 7/2009 | Kuriakose et al. |
| 2009/0249339 A1 | 10/2009 | Larsson et al. |
| 2009/0278871 A1 | 11/2009 | Lewis |
| 2009/0295712 A1 | 12/2009 | Ritzau |
| 2010/0053110 A1 | 3/2010 | Carpenter et al. |
| 2010/0079369 A1 | 4/2010 | Hartmann et al. |
| 2010/0193656 A1 | 8/2010 | Wilkenfeld |
| 2010/0194677 A1 | 8/2010 | Fiebrink |
| 2010/0250801 A1 | 9/2010 | Sangster et al. |
| 2010/0328200 A1 | 12/2010 | Yu |
| 2011/0012727 A1 | 1/2011 | Pance et al. |
| 2011/0157056 A1 | 6/2011 | Karpfinger |
| 2011/0181523 A1 | 7/2011 | Grothe et al. |
| 2011/0193362 A1 | 8/2011 | Prahlad |
| 2011/0304580 A1 | 12/2011 | Wu et al. |
| 2012/0035934 A1 | 2/2012 | Cunningham |
| 2012/0038495 A1 | 2/2012 | Ishikawa |
| 2012/0038675 A1 | 2/2012 | Johnson et al. |
| 2012/0050314 A1 | 3/2012 | Wang |
| 2012/0089348 A1 | 4/2012 | Perlin |
| 2012/0105375 A1 | 5/2012 | Yamada |
| 2012/0166993 A1 | 6/2012 | Anderson et al. |
| 2012/0169598 A1 | 7/2012 | Grossman et al. |
| 2012/0176311 A1 | 7/2012 | Bittenson |
| 2012/0194457 A1 | 8/2012 | Cannon |
| 2012/0235909 A1 | 9/2012 | Birkenbach |
| 2012/0272179 A1 | 10/2012 | Stafford |
| 2012/0306767 A1 | 12/2012 | Campbell |
| 2012/0313858 A1 | 12/2012 | Park et al. |
| 2013/0050124 A1 | 2/2013 | Helot |
| 2013/0082928 A1 | 4/2013 | Kim et al. |
| 2013/0111391 A1 | 5/2013 | Penner et al. |
| 2013/0132885 A1 | 5/2013 | Maynard et al. |
| 2013/0242455 A1 | 9/2013 | Prahlad |
| 2013/0285901 A1 | 10/2013 | Lee et al. |
| 2014/0043289 A1 | 2/2014 | Stern |
| 2014/0051484 A1 | 2/2014 | Hunt et al. |
| 2014/0139455 A1 | 5/2014 | Argiro |
| 2014/0168083 A1 | 6/2014 | Ellard |
| 2014/0168132 A1 | 6/2014 | Graig |
| 2014/0327628 A1 | 6/2014 | Tijssen |
| 2014/0191927 A1 | 7/2014 | Choi |
| 2014/0195933 A1 | 7/2014 | Rao |
| 2014/0204127 A1 | 7/2014 | Tann et al. |
| 2014/0210748 A1 | 7/2014 | Narita |
| 2014/0267866 A1 | 9/2014 | Short et al. |
| 2015/0039317 A1 | 2/2015 | Klein et al. |
| 2015/0097803 A1 | 4/2015 | Leigh et al. |
| 2015/0098182 A1 | 4/2015 | Liu et al. |
| 2015/0131913 A1 | 5/2015 | Anderson et al. |
| 2015/0169080 A1 | 6/2015 | Choi |
| 2015/0169531 A1 | 6/2015 | Campbell |
| 2015/0248235 A1 | 9/2015 | Offenberg |
| 2015/0250021 A1 | 9/2015 | Stice et al. |
| 2015/0268773 A1 | 9/2015 | Sanaullah et al. |
| 2015/0317839 A1 | 11/2015 | Miller |
| 2015/0379964 A1 | 12/2015 | Lee et al. |
| 2016/0054905 A1 | 2/2016 | Chai et al. |
| 2016/0063762 A1 | 3/2016 | Heuvel et al. |
| 2016/0085358 A1 | 3/2016 | Palanisamy |
| 2016/0091990 A1 | 3/2016 | Park |
| 2016/0126779 A1 | 5/2016 | Park |
| 2016/0179245 A1 | 6/2016 | Johansson et al. |
| 2016/0239145 A1 | 8/2016 | Chang |
| 2016/0294973 A1 | 10/2016 | Bakshi et al. |
| 2016/0313816 A1 | 10/2016 | Krishnakumar et al. |
| 2016/0313821 A1 | 10/2016 | Bui et al. |
| 2016/0316186 A1 | 10/2016 | Krishnakumar |
| 2016/0349926 A1 | 12/2016 | Okumura |
| 2016/0378258 A1 | 12/2016 | Lyons et al. |
| 2017/0109936 A1 | 4/2017 | Powderly et al. |
| 2017/0220114 A1 | 8/2017 | Iino |
| 2017/0269722 A1 | 9/2017 | Krishnakumar et al. |
| 2018/0074639 A1 | 3/2018 | Powell |
| 2018/0088792 A1 | 3/2018 | Klein |
| 2018/0129335 A1 | 5/2018 | Stone |
| 2018/0129336 A1 | 5/2018 | Files |
| 2018/0129337 A1 | 5/2018 | Stone |
| 2018/0129347 A1 | 5/2018 | Files |
| 2018/0129348 A1 | 5/2018 | Files |
| 2018/0298959 A1 | 10/2018 | Battlogg |
| 2018/0314416 A1 | 11/2018 | Powderly |
| 2018/0373350 A1 | 12/2018 | Rao et al. |
| 2019/0012003 A1 | 1/2019 | Grant |
| 2019/0155477 A1 | 5/2019 | Busby |
| 2019/0163271 A1 | 5/2019 | Heubel |

OTHER PUBLICATIONS

Harrison, C., OmniTouch: "Wearable Multitouch Interaction Everywhere," Oct. 2011, http://chrisharrison.net/projects/omnitouch/omnitouch.pdf.

Ibar, Intelligent Surface System, printed Aug. 24, 2015 http://www.i-bar.ch/.

Indiegogo, E-inkey Dynamic Keyboard, printed Sep. 9, 2015 http://www.indiegogo.com/projects/e-inkey-dynamic-keyboard.

Leap Motion, Mac & PC Motion Controller for Games, Design, Virtual Reality & More, printed Aug. 24, 2015 https://www.leapmotion.com/.

Mistry et al., WUWuw—Wear UR World: A Wearable Gestural Interface, Apr. 4-9, 2009, Proceeding CHI '09 Extended Abstracts on Human Factors in Computing Systems, pp. 4111-4116.

razerzone.com, Razer Blade Pro, printed Aug. 24, 2015, http://www.razerzone.com/gaming-systems/razer-blade-pro.

Schmalstieg et al., Bridging Multiple User Interface Dimensions with Augmented Reality, Oct. 6, 2000, 2000 (ISAR 2000), Proceedings. IEEE and ACM International Symposium on Augmented Reality, pp. 20-29.

Sine Walker, MS-Windows focus-follows-mouse Registry hacks, Mar. 10, 2010, wordpress.com, https://sinewalker.wordpress.com/2010/03/10/ms-windows-focus-follows-mouse-registry-hacks/, pp. 1-2.

Smith, M., Alienware M17X R4 Review, Jun. 21, 2012, http://www.digitaltrends.com/laptop-reviews/alienware-m17x-r4-review/.

Sternon, J., Intel Nikiski Laptop Prototype with See-Through Touchpad Hands-On Pictures and Video, Jan. 9, 2012, http://www.theverge.com/2012/1/9/2694171/Intel-Nikiski-hands-on-pictures-video.

Sun Innovations, Expanded Heads-Up Display (E-HUD), printed Aug. 24, 2015 http://www.sun-innovations.com/index.php/products/fw-hud.

(56) References Cited

OTHER PUBLICATIONS

UBI, Sensor, printed Aug. 24, 2015, http://www.ubi-interactive.com/product/#UbiSensor.

INFORMATION HANDLING SYSTEM TOUCH DEVICE FALSE TOUCH DETECTION AND MITIGATION

CROSS REFERENCE TO RELATED APPLICATION

U.S. patent application Ser. No. 16/021,578, entitled "Information Handling System Dynamic Friction Touch Device for Touchscreen Interactions" by inventors John T. Morrison, Jace W. Files, and Gerald Pelissier, filed on Jun. 28, 2018, describes exemplary methods and systems and is incorporated by reference in its entirety.

U.S. patent application Ser. No. 16/021,608, entitled "Information Handling System Touch Device Context Aware Input Tracking" by inventors Michiel Knoppert, Yagiz Yildiz, Jace Files, filed on Jun. 28, 2018, describes exemplary methods and systems and is incorporated by reference in its entirety.

U.S. patent application Ser. No. 16/021,645, entitled "Information Handling System Touch Device with Adaptive Haptic Response" by inventors Michiel Knoppert, Mark Ligameri, Jace Files, John T. Morrison, filed on Jun. 28, 2018, describes exemplary methods and systems and is incorporated by reference in its entirety.

U.S. patent application Ser. No. 16/021,695, entitled "Information Handling System Touch Device with Visually Interactive Region" by inventors Michiel Knoppert, Jace Files, John T. Morrison, and Mark Ligameri, filed on Jun. 28, 2018, describes exemplary methods and systems and is incorporated by reference in its entirety.

U.S. patent application Ser. No. 16/021,714, entitled "Information Handling System Touch Device with Automatically Orienting Visual Display" by inventors Yagiz Yildiz, Jace Files, Daniel Hamlin, Michiel Knoppert, Trevor Morrison, and Preeth Srinivasan, filed on Jun. 28, 2018, describes exemplary methods and systems and is incorporated by reference in its entirety.

BACKGROUND OF THE INVENTION

Field of the Invention

The present invention relates in general to the field of information handling system input devices, and more particularly to information handling system touch devices with a visually interactive region.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, information handling systems process end user inputs made at input devices to create outputs that are typically presented to an end user at output devices. Conventional information handling systems accept inputs at a keyboard, process the information with an application, and output the information at a display. Keyed inputs provide simple and reliable data typically sent as an interrupt from a keyboard to an embedded keyboard controller of the information handling system, and then forwarded from the embedded controller to an operating system that coordinates use by an active application. For example, keyed inputs sent to an operating system while a word processing application is active are applied by the word processing application to show the keyed inputs at a display, such as in a window generated by the word processing application. Although keyboards offer a simple and reliable input device, in many cases, keyboard-based commands are inefficient and difficult to remember, so applications also work with pointing devices, such as a mouse or touchpad. Pointing devices present an image at a display, such as an arrow, based upon end user manipulation or movement of the pointing device and accept an input with a button push or similar manipulation at the pointing device. Pointing device inputs are typically sent from the keyboard controller to the operating system with a position of the arrow on the display so that the operating system and application can determine the value of the input based upon the position and input devices presented at a user interface.

Wide spread adoption of portable information handling systems have also made touchscreen displays a viable alternative for performing inputs to an operating system and or application. With a touchscreen user interface, an end user touches the touchscreen at a user interface location to make an input value set by the user interface location. Touchscreen user interfaces may define values with input buttons presented by an application, or may define a user interface that more generally accepts end user inputs. For example, operating systems support presentation of a keyboard user interface on a touchscreen and then accepts end user inputs as touches at the keyboard that have the key value presented in the user interface. Touchscreen keyboard displays provide a convenient input device for portable information handling systems that lack an integrated keyboard, however, translating end user touches to keyboard input values can present some difficulty. Typically, a touchscreen display includes a touch controller interfaced with capacitive sensors of the display so that the location of touches are determined and provided to the operating system. Touch controllers typically execute embedded code on a microcontroller so that capacitive values sensed at the touchscreen are constantly scanned or monitored to determine touch inputs. One difficulty faced by touch controllers is discriminating between intentional touches meant as inputs and unintentional touches that often occur, such as thumb press on a touchscreen related to an end user grasp of a portable housing. Various touch algorithms apply touch area size, detected capacitance and the amount of time that the touch is detected to discriminate between intentional inputs and incidental touches. In addition, operating systems often sort through touches reported from a touch controller to determine the significance of touches to the operating system and application user interfaces. For instance, a touch outside of a user interface that is reported by a touch controller may simply be ignored by the operating system if the touch is at a non-relevant location.

As touchscreen displays have improved in resolution and touch detection accuracy, desktop touchscreen devices have become powerful tools to accept end user inputs. For example, the Canvas system sold by Dell Inc. rests on a desktop and accepts end user inputs as touches made to the touchscreen. A stylus used as a touch input device allows an end user to make precise touch inputs for drawing images. The desktop touchscreen presents a high resolution image as the stylus draws to provide the end user with real time visual feedback of the drawn image. In addition, the desktop touchscreen provides a broad work surface that can present helpful user interfaces at an end user's fingertips while the end user makes touch inputs. For example, the color, texture and size of stylus marks may be adjusted with a touch at a user interface. As another example, end user inputs as touches to a desktop touchscreen may be input through totem devices that rest on the desktop. For example, a circular totem resting on the touchscreen includes feet that provide touches at defined orientations so that a touch controller can detect the location and rotational orientation of the totem. An end user makes inputs to the totem by rotating the totem or moving the totem's position at the touchscreen display. The operating system or an application may provide a user interface near the totem that defines the input values for the end user, such as letting a user select a drawing color by rotation of the totem.

One difficulty with the use of totems on a desktop touchscreen display is that a touch controller and operating system have an entirely different type of touch input to monitor for discrimination between intended and unintended inputs. For example, an end user might leave one or more totems untouched on a display for an extended time period, resulting in a fixed input that has to be monitored and compared with other touches. When the end user does interact with the totem, intended inputs might include small movements that are difficult to measure and to discriminate from unintended inputs. For instance, an end user who rotates a totem might also move the totem linearly (i.e, along a line relative to a center position of the totem), leaving the touch controller and operating system struggling to discern the intended input. The difficulty in discerning intended input is further complicated where a user rests a finger, hand and/or arm on the touchscreen during the inputs to the totem. In addition, inadvertent motion of a touchscreen display, such as to angle the display for pen inputs by lifting one side, can cause movement of a totem without an end user touch. In some instances, an end user will move a totem simply to look at content underneath the totem or to increase the interactive area available on the touchscreen display. In other instances, an end user will move a totem to make an input not realizing that the totem has reached a maximum input. Each scenario involves different analysis for isolating end user intent and determining an appropriate input for use by an information handling system.

SUMMARY OF THE INVENTION

Therefore, a need has arisen for a system and method which provides information handling system touch device context aware input tracking.

A further need exists for a system and method that mitigates false touch and other false inputs to improve totem device input precision.

A further need exists for a system and method that restricts totem movement at a touchscreen display to limit unintended inputs.

A further need exists for a system and method that leverages a totem footprint to interact with an end user through visual images.

A further need exists for a system and method that provides an end user feedback of totem interactions.

In accordance with the present invention, a system and method are provided which substantially reduce the disadvantages and problems associated with previous methods and systems for interacting with objects placed on a touch detection surface, such as a totem placed on a touchscreen display. User interfaces presented by a touch detection surface provide context for interpreting touches at the touch detection surface and provide feedback to an object placed on the touch detection surface.

More specifically, an information handling system presents visual images at a touchscreen display and interprets touches at the touchscreen display as input values. An object placed on the touchscreen display, such as a totem, provides a tool that intermediates end user inputs to the touchscreen display, such as with rotation or linear movement of the object relative to a user interface presented at the touchscreen display. In order to more efficiently manage totem position reporting from a touch controller of the touchscreen display to the information handling system, the touch controller filters touch inputs by the totem so that only those touches associated with the user interface are communicated to the operating system. For example, a rotational user interface that accepts inputs based upon rotation of the totem has linear movement of the totem filtered from positions reported by the touch controller to an operating system of the information handling system. Position tracking by the touch controller may be enhanced with active capacitance selectively provided to the feet of the totem, such as by providing a more clear touch indication for a center point or a rotational reference point of the totem. Detection and monitoring of the totem with touches at the touchscreen can include capacitance levels associated with feet that are distinguishable from capacitance levels of finger touches. For instance, a capacitance band defined for totem touches that falls below a threshold for finger touches allows a touch controller to apply totem detection logic more rapidly and without including finger touch detection logic. Logic, communication, friction and haptic response devices disposed in a totem provide feedback at the totem device to further enhance an end user experience. For example, a friction device selectively locks and releases a totem in place on a touch surface to prevent undesired movement. A haptic device provides physical feedback at the totem that corresponds to user interface input values, such as input increments and input limits. Visual interactions with the totem may include a display integrated in the totem upper surface or a visual access opening that presents visual images from the supporting touch surface at the totem, such as through an opening that forms a ring with an exposed display portion within the ring. Visual images at the totem automatically orient to present to an end user for viewing, such as by adjusting visual image orientation as the totem rotates.

The present invention provides a number of important technical advantages. One example of an important technical advantage is that an operating system experiences less load and latency in managing totem touch inputs by filtering out totem touch input components that are not relevant to a totem user interface. For instance, the operating system only has to interpret rotational movement associated with a rotational user interface, so linear movement is filtered out until movement of the user interface becomes desirable, such as to change a position of the user interface. An operating system clarifies for a touch controller the relevant totem touch points by controlling active capacitance at the totem. For example, with a linear user interface the operating system has a center foot with an active capacitance that highlights linear versus rotational movement during inputs. As another example, an operating system commands varied capacitance at totem feet so that a touch controller better tracks the totem, such as by keeping each totem's feet in a defined capacitance range below a finger touch capacitance threshold so that the touch controller tracks multiple totems in a range distinct from finger touches and, in one example, distinct for each totem. Friction, actuator and haptic devices provide further end user convenience by placing a totem in a desired location and providing real time user feedback related to totem parameters. Further, presenting visual information at a totem surface or within the interior of the totem allows full use of the display space, even that below the totem, including priority information presented at the focus of an end user. For instance, a totem used for inputs to a user interface presents numerical values of the input to aid the user's interactions, and highlights critical information to the user's view as needed, such as with messages and notifications presented on the totem as relevant information arrives at the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Touch objects disposed on a touchscreen display, such as totems that intermediate end user touch inputs, are managed by coordination of a touch controller of the touchscreen display and operating system of an information handling system to adapt to inputs based upon a user interface context. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
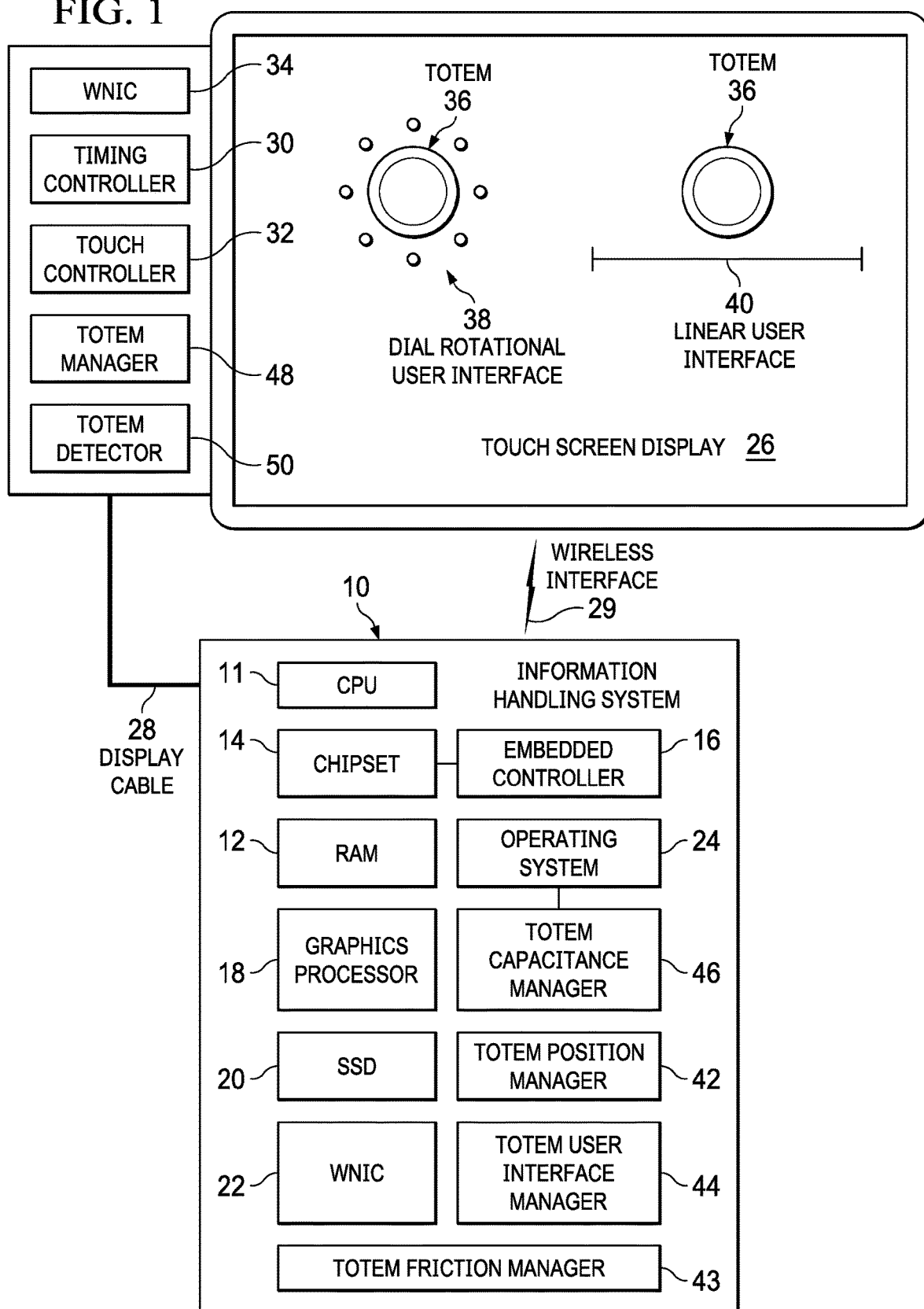
FIG. 1 depicts a block diagram of an information handling system configured to manage touch inputs at a touchscreen display by an object, such as a totem.

Referring now to FIG. 1, a block diagram depicts an information handling system 10 configured to manage touch inputs at a touchscreen display 26 by an object, such as a totem 36. In the example embodiment, information handling system 10 processes information with a central processing unit (CPU) 11 that processes information using instructions stored in random access memory (RAM) 12. A chipset 14 includes a variety of processing components and persistent memory that coordinate access to information and instructions, such as with interfaces to external input/output (I/O) devices, communication resources and power resources. For instance, an embedded controller 16, also known as a keyboard controller, executes embedded code stored in flash memory that manages inputs, such as from a mouse, keyboard, or touchpad, for communication to CPU 11. A graphics processor unit (GPU) 18 interfaces with CPU 11 and RAM 12 to process information for presentation as visual images at a display, such as by generating pixel values that define a visual image. A solid state drive (SSD) 20 or other persistent storage device stores information during power down, such as instructions for execution by CPU 11 that processes information. For instance, an operating system and applications retrieved from SSD 20 to RAM 12 process information based upon inputs by an end user through I/O device. A wireless network interface card (WNIC) 22 interfaces with CPU 11 to support wireless communications, such as through a wireless wide area network (WWAN), a wireless local area network (WLAN), or various peripheral and IoT wireless devices, such as through Bluetooth. In various alternative embodiments, other types of hardware components may be used to build information handling system 10 to meet desired capabilities. For example, information handling system 10 may include various types of desktop or portable configurations, such as laptops, convertible systems and tablets.

In the example embodiment, touchscreen display 26 interfaces with information handling system 10 through a cable 28, such as DisplayPort cable, to present visual images communicated from information handling system 10 as pixel values. For example, a timing controller 30 receives the pixel values through display cable 28 and scans the pixel values to pixels disposed across touchscreen display 26. Touches made to touchscreen display 26 are detected by a touch surface, such as capacitive sensors integrated in touchscreen display 26, and interpreted in part by a touch controller 32 to determine inputs to report to information handling system 10. In an alternative embodiment, visual information and touch inputs may be communicated through a wireless interface 29, such as by a WNIC 34 disposed in touchscreen display 26 that communicates wirelessly with WNIC 22 disposed in information handling system 10 or other types of wireless communication mediums. In the example embodiment, touchscreen display 26 has first and second totems 36 placed on the touch surface to act as intermediaries for end user touch inputs to touchscreen display 26. Generally, a totem 36 is an object placed on a touch surface that provides a distinguishable touch pattern so that manipulation of the object aids an end user in performing touch inputs. For instance, a totem 36 has a size adapted to accept a hand grasp so that an end user may readily manipulate the object while distinguishable features on a bottom surface provide relatively precise tracking of the inputs. Thus, for instance, an end user may make precise hand movements to perform small inputs measured by a totem 36 movement at a touch surface that would be difficult to perform with finger or hand touches. In the example embodiment, one totem 36 has a dial rotational user interface 38 presented around its physical position to provide an end user with a visual reference for making rotational inputs by rotating totem 36. Another totem 36 has a linear user interface 40 presented below its physical position to provide an end user with a visual reference for making linear inputs by sliding totem 36. For instance, dial rotational user interface 38 receives an input value for each incremental rotation of totem 36, such as to change an audio volume, a color selection or other input value. Linear user interface 40 receives an input value for each liner movement of totem 36, similar to inputs made at rotational user interface 38.

During operation of information handling system 10, a variety of hardware, embedded code and software elements cooperate to select and present user interfaces that enhance totem 36 interactions. In the example embodiment, an operating system 24, such as WINDOWS, generally coordinates interactions with end user devices, such as a keyboard, mouse and touchscreen 26. Touches by a totem 36 detected by touch controller 32 are reported to operating system 24, which assigns the touches as input values based upon the context of presented visual images, such as user interfaces associated with the totem 36. In the example embodiment, operating system 24 manages totem inputs with software and embedded code modules that monitor and adapt to touches at touchscreen display 26 as an end user interacts with touches and totem manipulations at touchscreen display 26. For example, a totem user interface manager 44 provides an application programming interface that supports selection by the operating system and/or an application of a user interface for presentation with a totem 36 disposed on touchscreen display 26. For instance, totem user interface manager 44 selects a rotational and/or linear user interface with an associated input value for totem 36 motion detected on touchscreen display 26 and presents the selected user interface as a visual image through GPU 18 at a location indicated by a touch of totem 36. Totem user interface manager 44 interacts with a totem manager 48 executing on touch controller 32 or similar processing resource of touchscreen display 26 to manage totem input type and sensing based upon the selected user interface presented for a totem 36. As an example, as is described in greater detail below, totem manager 48 filters touches detected at touchscreen display 26 based upon the type of user interface to improve input accuracy and reduce false touch detection events. For instance, totem manager 48 adjusts touch controller 32 touch detection so that linear movements of a totem 36 are filtered out if a rotational user interface 38 is associated with totem 36 and rotation movements of totem 36 are filtered out if a linear user interface 40 is associated with totem 36. Reporting only relevant totem 36 movement to operating system 24 from touch controller 32 reduces system level processing at CPU 11 to sort out input values intended by an end user. In one example embodiment, totem manager 48 monitors touches detected at touch controller 32 to infer from the touches whether rotational or linear movement is intended by an end user, communicates the inferred type of motion to operating system 24, and then sends filtered inputs of the inferred type to operating system 24 and input values that remove unintended movements. In summary, if totem movement indicates rotational inputs, only rotational movement is reported; whereas if totem movement indicates linear inputs, only linear movement is reported.

In one example embodiment, a totem capacitance manager 46 in operating system 24 coordinates with totem manager 48 and a totem detector 50 to manage a touch pattern created by totem 36 on touchscreen display 26. For example, totem capacitance manager 46 commands an active capacitance of a targeted value at one or more feet of a totem 36 so that a totem detector 50 cooperating with touch controller 32 may more quickly isolate and track totem 36. As set forth in greater detail below, capacitance of the feet of totem 36 may target a value below that of a finger touch detection yet above a noise level so that touch controller 32 scans touches within a capacitance range to locate defined patterns associated with totem feet. Totem detector 50 tracks totem 36 to determine end user inputs, and also to isolate unintended touches so that false inputs are avoided. For instance, a totem position manager 42 and totem friction manager 43 interact with an actuator within totem 36 to prevent unintended movement of totem 36, such as by changing friction of totem 36 against the touchscreen surface, and to move a totem 36 across the touchscreen surface to desired position. For instance, if touchscreen display 26 tilts from a horizontal orientation to a more vertical orientation so that gravity induces totem 36 to move, totem friction manager 43 actuates a friction device to provide increased frictional resistance to movement. In one embodiment, a totem friction manager 43 is included within totem 36 to detect and stop unintended motion, such as by detecting accelerations at totem 36 when no touches are present at totem 36. In another embodiment, totem position manager 42 commands an actuator to move totem 36 at touchscreen display 26 so that totem 36 is out of the way of a desired visual image. Other alternative embodiments and implementations of the totem 36 management software and embedded code are set forth below in greater detail.

Figure 2:
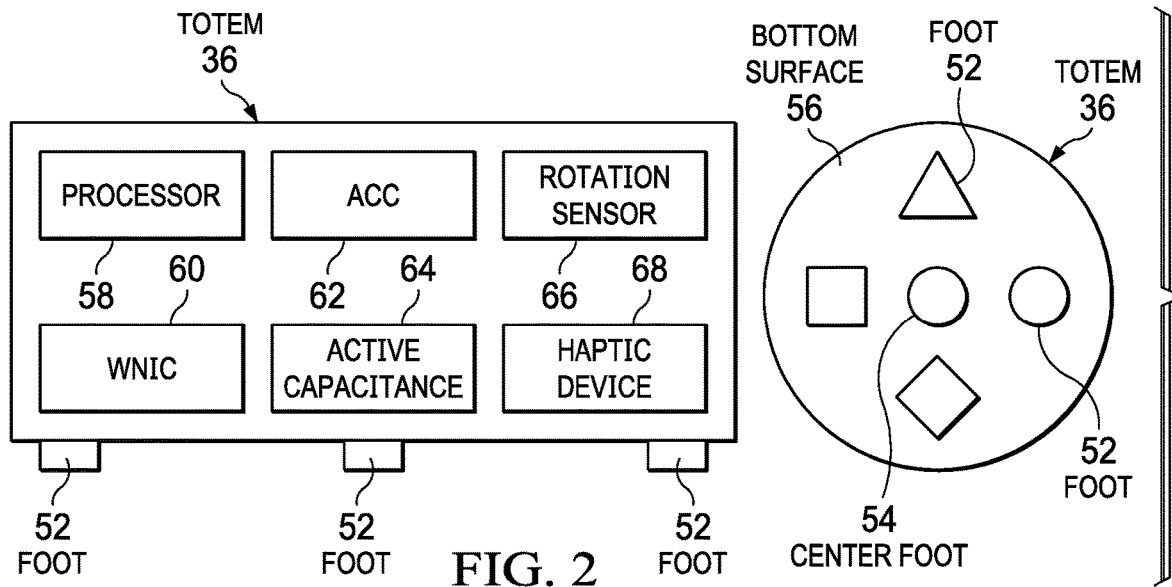
FIG. 2 depicts a block diagram of an example totem that interacts with a touchscreen display and information handling system.

Referring now to FIG. 2, a block diagram depicts an example totem 36 that interacts with a touchscreen display 26 and information handling system 10. In the example embodiment, totem 36 has a circular housing sized to accept a palm grasp and containing processing components that support interaction with an information handling system through a communication medium, such as a wireless interface or adjustments of capacitance at touchscreen display 26 touch surface. Totem 36 has plural feet 52 disposed on a bottom surface 56 and configured to create a predetermined touch pattern on a touch detection surface. In the example embodiment, plural feet 52 are disposed around a periphery of totem 36 with each foot having an individualize shape, such as a square, rectangle, circle and triangle, that allow discernment by a touch controller of the relative orientation of totem 36 on the touch surface. A center foot 54 is located at a center location of totem 36 to provide a reference for linear motion of totem 36 across touchscreen display 26. Within totem 36, a processor 58 executes embedded code stored in persistent memory to perform totem functions in cooperation with communications from an information handling system. For example, processor 58 is an ARM based processor or a microcontroller that supports Bluetooth communication through a WNIC 60. Processor 58 interfaces with an accelerometer 62 to sense accelerations, an active capacitance 64 to adjust capacitance of feet 52 and 54, a rotation sensor 66 to sense rotation relative to a supporting surface of feet 52 and 54, and a haptic device 68 that causes motion of totem 36, such as with a vibrating offset weight.

In operation, processor 58 adjusts feet 52 and 54 capacitance with active capacitance 64 to aid in detection and tracking of totem 36 by touchscreen display 26 touch controller 32. For example, when a rotational user interface 38 is presented, totem capacitance manager 46 increases capacitance of feet 52 on the perimeter of totem 36 to improve tracking rotational movement; and when a linear user interface 40 is presented, totem capacitance manager 46 increases capacitance of center foot 54 to improve tracking linear movement. In one embodiment, processor 58 monitors accelerations detected by accelerometer 62 to discern whether totem motion is primarily rotational of linear and reports the type of motion to totem manager 48 so that an appropriate filter may be used on detected totem touches reported to information handling system 10. Rotation sensor 66 is, for example, a light-based sensor that tracks rotational movement based upon light directed towards a support surface and reflected back to rotation sensor 66. In the event that totem 36 is lifted away from or placed on a support surface, rotation sensor 66 detects changes in distance to the support surface that provide an indication of lift-off or resting of totem 36 on the support surface. Haptic device 68 is selectively activated by processor 58 based upon communications received from information handling system 10 or from detection of predetermined conditions at totem 36. For example, haptic device 68 may provide vibration or movement to indicate to an end user that an input value was detected in association with a user interface, such as by clicking at an incremental input or rotating against an input limit, such as over rotation of totem 36 relative to a user interface value. In alternative embodiments, haptic device 68 may provide an actuator associated with other totem functions, such as setting friction or generating movement as describe above.

Figure 3:
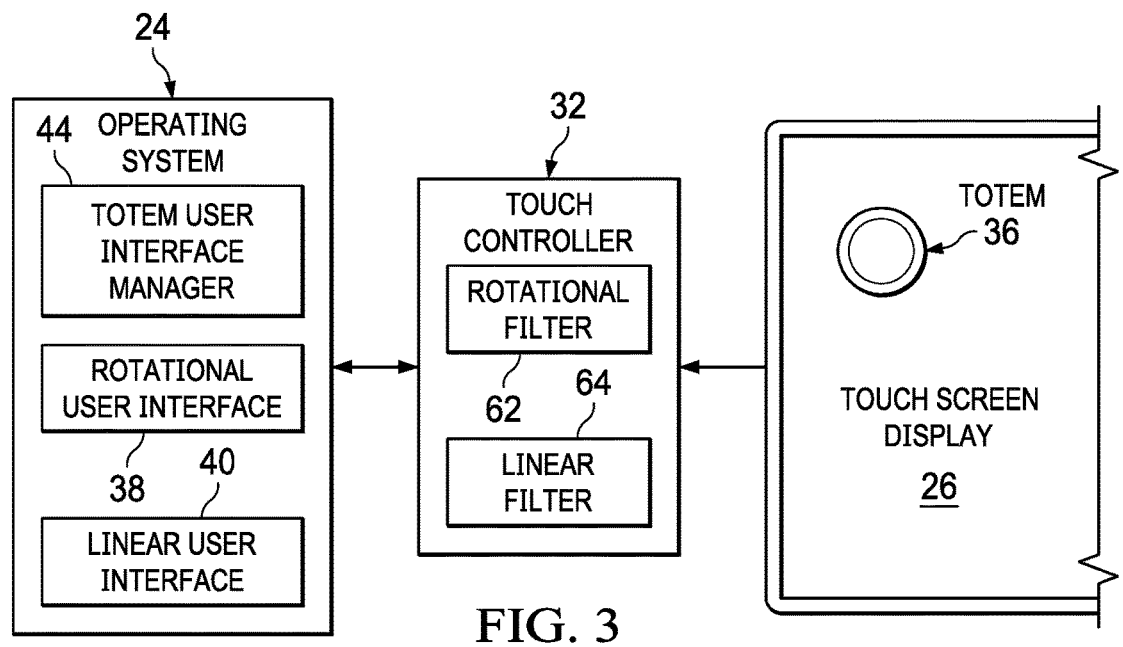
FIG. 3 depicts a block diagram of a system that manages totem touch inputs based upon a user interface presented for the totem at a touchscreen display.

Referring now to FIG. 3, a block diagram depicts a system that manages totem 36 touch inputs based upon a user interface presented for the totem 36 at a touchscreen display 26. In the example embodiment, operating system 24 includes totem user interface manager 44 to select a rotational user interface 38 or a linear user interface for presentation at touchscreen display 26. Selection of rotational user interface 38 implements a rotational filter 62 on touch controller 32 so that rotational input values are reported to operating system 24 with linear movements of totem 36 filtered out. Selection of linear user interface 40 implements a linear filter 64 on touch controller 32 so that rotational movements of totem 36 are filtered out. Operating system 24 responds more quickly while consuming fewer system level processing resources by having only rotational or linear input values communicated from the touch controller based upon the user interface associated with totem movement. Specifically, as an end user's movement of a totem 36 include unintended incidental vectors, filtering related touches from intended inputs reported to operating system 24 reduces analysis of inputs by operating system 24 to resolve an end user's intended input. In one example embodiment, during rotational inputs made by rotational movement of totem 36 at a rotational user interface 38, a center position of totem 36 is incrementally tracked in order to maintain the user interface position relative to the totem position, such as by re-centering the user interface for each linear movement detected of a totem center foot 54 of greater than a predetermined amount. In another example embodiment, touch controller 32 obtains from totem user interface manager 44 an amount of linear or rotational movement associated with an incremental input and reports input values only as the amount of movement is detected. Operating system 24 experiences a further reduced load analyzing touches as updated touch positions are reported only as the touch positions for totem 36 become relevant to the user interface associated by operating system 24 with totem 36.

In one example embodiment, operating system 24 controls touch reports by touch controller 32 of totem 36 so that only relevant touches are reported. For example, capacitance at totem feet is adjusted based upon a presented user interface and reported to touch controller 32, such as by having different defined capacitances at different feet associated with totem 36 rotational orientations. In one example embodiment, a specific capacitance associated with a center foot aids touch controller 32 in filtering rotational and linear motion by simplifying tracking of the totem center position. During presentation of a rotational user interface, a filtered rotation input value is generated by subtracting a vector of center foot movement from that of feet located on the perimeter, resolving to rotational movement to report to the operating system without linear movement included. As movement of the center foot reaches a threshold value, touch controller 32 reports the movement to operating system 24, which re-centers the user interface and resets the center position. In this manner, incidental linear movements of totem 36 induced by off-center rotation of totem 36 does not impact operating system performance tracking end user rotational inputs. In one example embodiment, touch controller 32 reports to operating system 24 if a selected user interface does not match inputs made at a totem by an end user. For example, if movement detected at touchscreen 26 of totem 36 have a greater vector in linear or rotational input values than the user interface type presented at the totem, touch controller 32 may request a change of user input type at operating system 24. Similarly, in the event that a user interface includes both a rotational and a linear input vector, each detected input vector may be reported separately from touch controller 32 to operating system 24 so that inputs are logically separated into rotation and liner components. Touch controller 32 may accomplish reporting as separate components by reporting each component with an identifier of the input type, or by reporting totem touch positions that resolve to linear and rotation components, even where the reported touch positions do not initially match the actual totem position as detected by touches at touchscreen display 26. Thresholds for reporting linear or rotation movement may be communicated from operating system 24 to touch controller 32 and applied by touch controller 32 so that user interface context remains consistent with end user input expectations.

Figure 4:
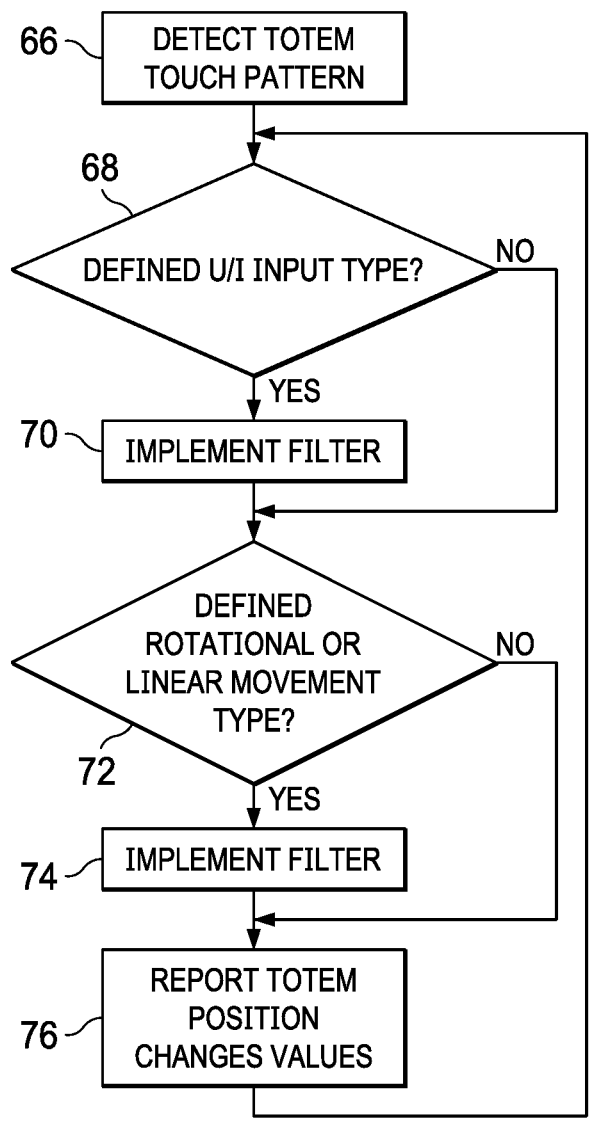
FIG. 4 depicts a flow diagram of a process for managing totem touch inputs at a touchscreen display touch controller.

Referring now to FIG. 4, a flow diagram depicts a process for managing totem touch inputs at a touchscreen display touch controller. The process starts at step 66 with detection of a totem touch pattern at a touchscreen display. The totem touch pattern may be related to an arrangement of feet on the totem bottom surface or an indication of totem type with active capacitance generated at the totem feet. As another example, an end user palm or arm position detected on a touch screen may provide an indication that a totem is in use as well as information on the user as right handed or left handed. In addition, the position of the arm and hand may indicate a base orientation of the user relative to the totem, such as to set a location for zero rotation relative to the end user and touchscreen display. Once a totem is detected at step 66, the touch controller determines at step 68 if the totem is associated with a defined user interface type, such as a rotational user interface or linear user interface. For example, the touch controller provides the totem touch positions to the operating system and receives from the operating system the type of user interface associated with the totem. If the operating system has a defined user interface type, the process continues to step 70 to implement a touch filter for the user interface type, such as a rotation or linear filter. In one example embodiment, if no user interface type is defined the touch controller defaults to a user interface type that tracks and reports only a center position of the totem, such as coordinates of a center foot exposed at the totem bottom surface. At step 72, a determination is made of whether movement at a totem is associated with a defined user interface type, such as by comparing a component of movement associated with rotation and a component of movement associated with linear movement. In order to select a user interface type based upon detected movement, for instance, the amount of relative linear to rotation movement may be compared with a defined ratio associated with each type. For example, if a movement component in linear or rotation movement exceeds the other component by a ratio of five to one, the touch controller requests the user interface type from the operating system. If a movement-based user interface selection is made, the process continues to step 74 to implement a filter associated with the selected user interface type. At step 76, the touch controller reports totem positions based upon the selected user interface type, such as filtered rotation or linear movements.

Figure 5:
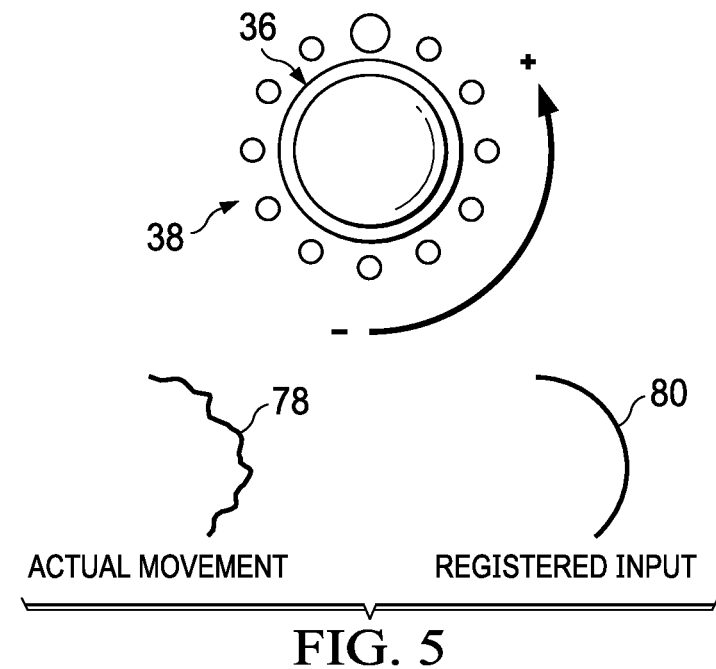
FIG. 5 depicts a top view of a totem on a touch detection surface to illustrate rotational touch inputs provided to an operating system having linear movement filtered out.

Referring now to FIG. 5, a top view of a totem 36 on a touchscreen display 26 touch detection surface illustrates rotational touch inputs provided to an operating system 24 having linear movement filtered out. In the example embodiment, an end user rotates totem 36 to make an input value through touches of the totem feet at touchscreen display 26. For example, the input value is derived from a relative rotational orientation of totem 36, which is communicated to operating system 24 and then presented at user interface 38 through varied color and/or illumination of a dial around the perimeter of totem 36. As totem 36 rotates counterclockwise (as depicted by the arrow), end user linear variations introduced to the position of totem 36 results in a track 78 of actual movement that includes both a rotational component reflecting change in relative orientation and a linear component reflecting a change in linear position. Filtering out the linear component of totem 36 movement results in positions reflected by track 80 having only the rotational component being sent from touch controller 32 to operating system 24. By sending operating system 24 only the rotational component, the intended input value is more readily discernible, resulting in reduced system level processing to sort out linear movements that are not relevant to rotational user interface 38. In the example embodiment, track 78 reflects an actual X-Y coordinate position report of a foot at a perimeter of totem 36 as the position changes over time. The actual position may be derived from a single foot having a unique touch pattern or from a comparison of multiple feet positions that resolve to a single location. Alternatively, touch controller 32 may report a coordinate position for each of plural totem 36 feet that touch touchscreen 26 so that operating system 24 compares the reported positions to resolve rotational orientation. In either case, the reported position that generates track 80 ignores linear motion by subtracting from each reported position any linear movement of totem 36 from a center of rotation. Movement at the center location may be derived from tracking a central foot or from comparison of multiple feet that touch in a known pattern around a central location. As the central location shifts by a distance greater than a threshold amount, the linear movement is reported by touch controller 32 to operating system 24 so that user interface 38 may be centered at a central position of totem 36. Alternatively, filtered positions of track 80 may be sent during rotational movement of totem 36 with an actual position of totem 36 sent after rotational movement completes. In alternative embodiments, alternative approaches may be taken to provide actual totem 36 coordinates from touch controller 32 to operating system 24 as the positions shift linearly from reported rotational component coordinates.

Figure 6:
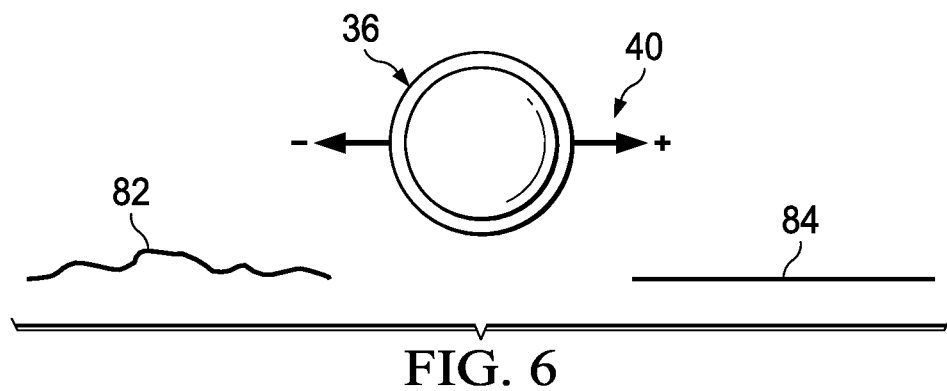
FIG. 6 depicts a top view of a totem on a touch detection surface to illustrate linear touch inputs provided to an operating system having rotational movement filtered out.

Referring now to FIG. 6, a top view of a totem 36 on a touchscreen display 26 touch detection surface illustrates linear touch inputs provided to an operating system 24 having rotational movement filtered out. Totem 36 provides an input value to operating system 24 based upon a central location relative to a linear user interface 40. As totem 36 central position moves linearly, an end user introduces some rotational and non-linear component to the movement, as reflected by the track 82 showing that actual center position coordinates change over time. In the example embodiment, user interface 40 has an input value that relates to the position of totem 36 along an X axis so that rotational movement and movement along the Y axis are not relevant to the input value assigned by operating system 24 to the totem position. In order to reduce system level processing, touch controller 32 reports only the X axis component of movement of totem 36 as reflected by track 84. Touch controller 32 filters out rotational movement and Y axis movement to report, for example, a constant Y axis value and a changing X axis value as coordinates to operating system 24 during movement of totem 36. The X axis value may be derived from a position of a central foot of totem 36 or from a central location of feet disposed about the center of totem 36. In the event that multiple feet positions are reported to operating system 24, each foot position has rotational movement and Y axis movement filtered out so that only changes to the X axis position are reported to operating system 24. As the reported Y axis position varies by greater than a threshold amount, updated coordinates may be sent to operating system 24 that include the actual Y axis position, such as to re-locate user interface 40 relative to totem 36. Alternatively, Y axis position may be updated after totem 36 completes its movement. In various embodiments, various components of motion may be filtered out based upon the user interface type and the ability of the operating system to manage reported inputs.

Figure 7:
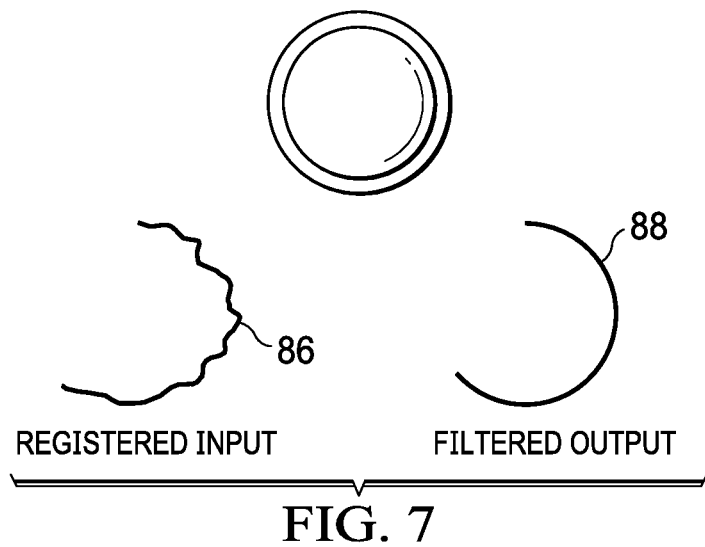
FIG. 7 depicts a top view of a totem on a touch detection surface to illustrate resolution of totem movement for selection at a touch controller of a rotational or linear input to report to an operating system.

Referring now to FIG. 7, a top view of totem 36 on a touchscreen display 26 touch detection surface illustrates resolution of totem movement for selection at a touch controller of a rotational or linear input to report to an operating system 24. In the example embodiment, track 86 reflects actual rotational and linear motion of totem 36 on a touch surface 26, such as the actual X-Y coordinates of a foot located off center and on the bottom surface of totem 36. Touch controller 32 detects both rotational and linear movement of totem 36 as reflected by track 86 and selects one of the linear or the rotational movement component to report to operating system 24. For example, touch controller 32 resolves rotational movement of totem 36 (as reflected by track 88) by subtracting out movement of a center position of totem 36 from each foot located along the perimeter of totem 36. The center position of totem 36 may be tracked based upon a center foot or a known relationship of off center feet to the center location. In the example embodiment, the movement of totem 36 linearly relative to a center location is relatively small compared with rotational movement of totem 36 about the center location. As a result, touch controller 32 determines a rotational input and reports only the rotational component of totem movement to operating system 24. If totem 36 movement reflected a greater proportion of X axis or Y axis movement components, the appropriate axis is reported individually with the other axis and the rotational components of movement filtered out. Touch controller 32 may report the type of input detected (i.e., X axis, Y axis or rotational) to operating system 24 so that operating system 24 can present an appropriate user interface, or touch controller 32 may simply report the component of movement that represents the largest proportion of movement so that operating system 24 selects a user interface associated with the movement type. Once movement of totem 36 has completed, touch controller 32 reports a complete actual position coordinate to allow operating system 24 to update any user interface position associated with totem 36.

Figure 8:
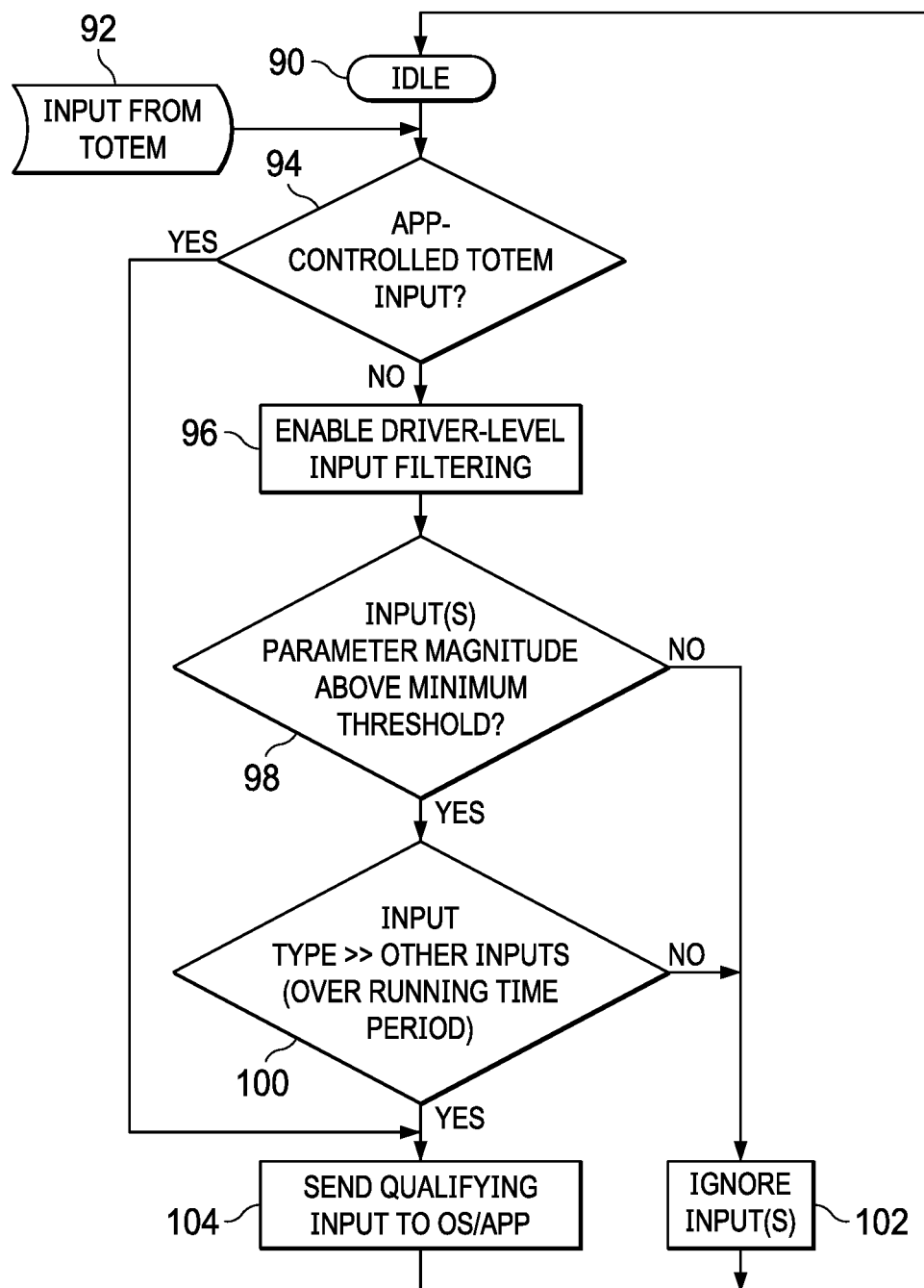
FIG. 8 depicts a flow diagram of a process for context aware input masking of totem touches at a touchscreen display.

Referring now to FIG. 8, a flow diagram depicts a process for context aware input masking of totem touches at a touchscreen display. By first defining the type of position information expected by an operating system, the touch controller is able to provide a clean data stream of the expected type so that the operating system can quickly apply input values, thus reducing latency associated with totem use. For example, if a user navigates a radial or dial interface with the operating system expecting the user to rotate the totem, small linear translations are masked by filtering linear motion to provide smooth rotation input values. If linear translations are larger than rotational movement by a threshold amount, then rotational movement is filtered to report the totem linear position change in one or both dimensions. The process starts at step 90 with the totem idle and the touch controller awaiting a change in totem position. At step 92 motion at the totem is detected as an input. At step 94, a determination is made of whether an application controlled input type is defined for the totem, such as a linear or rotational input type. If the input type is defined by the operating system, the process continues to step 104 where the input detected from movement of the totem is forwarded to the operating system if the input value is of the type expected by the operating system. The process then continues to step 90 to await a next input from movement of the totem.

If at step 94 the input type is not defined for the totem by the operating system, then the process continues to step 96 to enable touch controller driver level input filtering for the detected totem touch. For example, an embedded code module is executed at the touch controller to analyze the change in totem position and determine an input type for the movement. At step 98, a comparison is made of the detected totem position to determine if the change in totem position from the last reported totem position exceeds a threshold. If the position change exceeds the threshold, the process continues to step 100 to determine if the amount of movement for the input type meets a reporting threshold, such as an amount of movement associated with an input increment sufficient to report to the operating system. If the input meets the threshold to report to the operating system the process continues to step 104 to communicate the position update. If at steps 98 and 100 the movement size does not meet a threshold to define an input type or an input value, the process continues to step 102 to ignore the inputs and the process returns to step 90 to continue monitoring modem positions.

Figure 9:
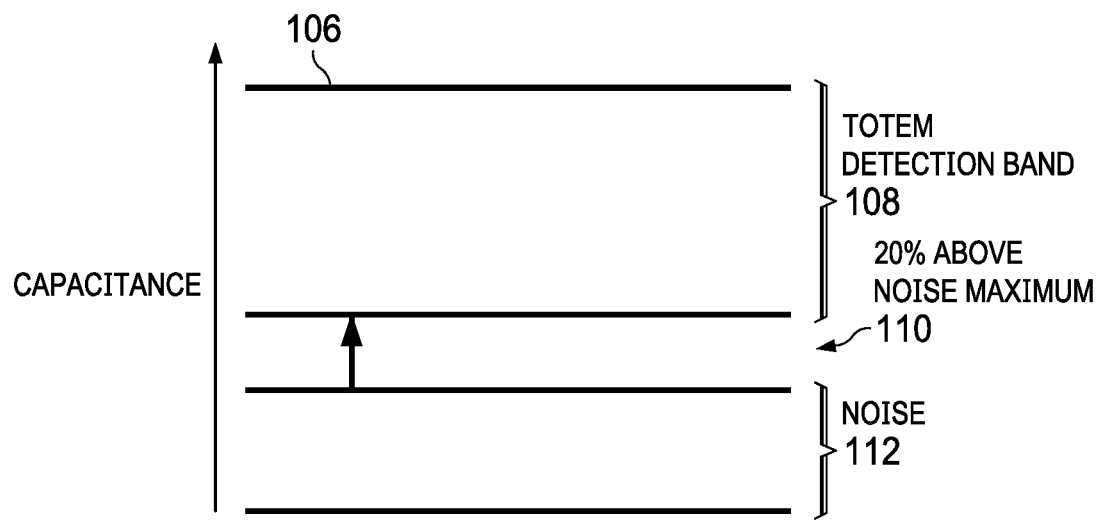
FIG. 9 depicts a graph of detected capacitance levels to illustrate that manipulation of capacitance at totem feet aids totem recognition and tracking.

Referring now to FIG. 9, a graph of detected capacitance levels illustrates that manipulation of capacitance at totem feet aids totem recognition and tracking. Touch controllers interpret capacitance sensed at an array of capacitance sensors by setting a threshold 106 as the minimum touch capacitance associated with a finger touch. In order to enhance recognition and tracking of totems and related objects that intermediate inputs to a touch detection device, a totem detection capacitance range 108 is defined below the finger touch threshold 106 to allow the touch controller to focus within the totem detection capacitance range 108 for detecting and tracking totems. In the example embodiment, the totem capacitance range is defined as a minimum level having a noise buffer 110 of 20% over a noise band 112 in which the touch controller ignores all signals. Within totem detection capacitance range 108, the touch controller performs a totem search algorithm that looks for predetermined totem touch patterns. By focusing a totem search and tracking algorithm to capacitances that fall below the finger touch threshold, the touch controller can more quickly scan through detected touches for defined patterns so that totem detection and tracking logic is avoided where a finger touch is indicated by a capacitance over the threshold. More specifically, in one example embodiment, the touch controller detection and tracking algorithm only performs totem search within totem capacitance band 108 by searching for touches that fall within the band and have a touch pattern of a known totem. In another example embodiment, once a totem is identified, totem feet capacitance may be adjusted to define a more specific search, such as increasing capacitance of one or more feet to create a touch pattern unique to the totem. In another example embodiment, touch controllers manage totem detection and tracking with a shorter logic stack to reduce latency by only searching for finger touches above threshold 106 and only searching for totem touches below threshold 106.

Figure 10:
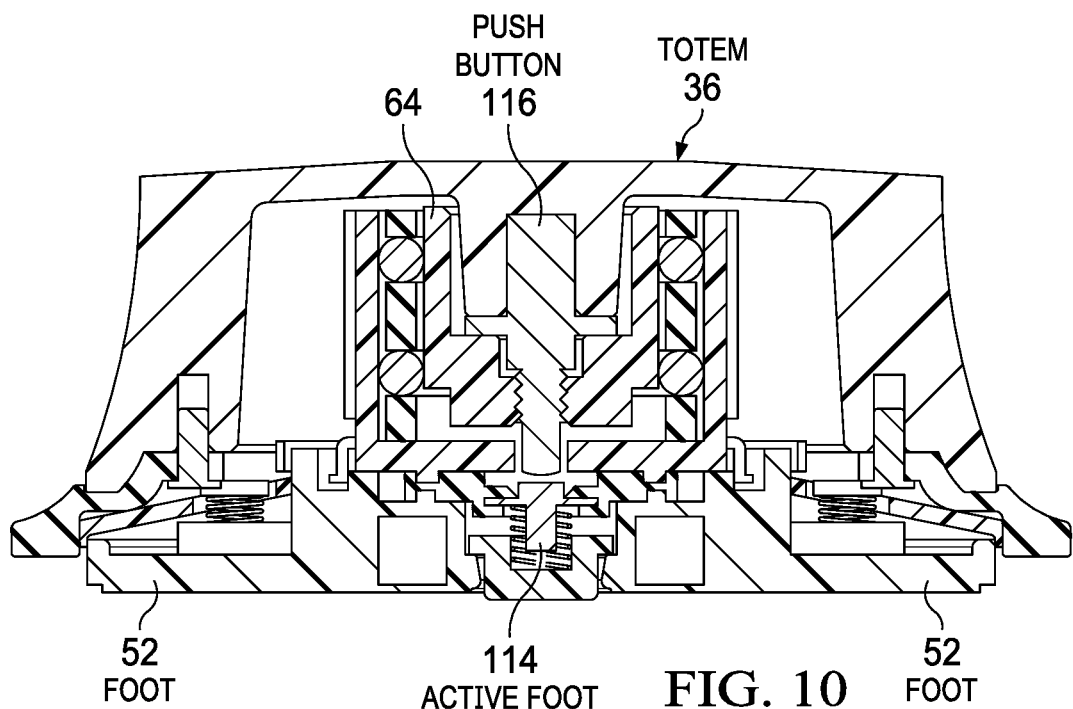
FIG. 10 depicts a side cutaway view of a totem having an active capacitance foot that adjusts capacitance to aid totem search and tracking by a touch controller.

Referring now to FIG. 10, a side cutaway view of totem 36 depicts an active capacitance foot 114 that adjusts capacitance to aid totem search and tracking by a touch controller. In the example embodiment, a center active foot 114 located at the bottom of totem 36 creates a programmable capacitance level for detection at a touch device, such as a touchscreen display. An active capacitance source 64 interfaces with foot 114 to vary the capacitance presented at foot 114 to the touch device. In the example embodiment, plural other feet 52 are disposed at a perimeter of totem 36 with a passive capacitance defined to fall within totem detection capacitance band 108. In an alternative embodiment, feet 52 may also include an interface with active capacitance source 64 to have capacitance adjusted as desired by totem 36 or an operating system interfaced with totem 36, such as through Bluetooth or other wireless interfaces. In the example embodiment, a push button 116 exposed at the top of totem 36 allows an end user to manually activate and deactivate capacitance by pressing down on push button 116 to activate capacitance and release push button 116 to deactivate capacitance.

In various embodiments, programmable capacitance at the feet of totem 36 provides a tool that aids in detection and tracking of totems to help reduce latency in the reporting of touches by a touch controller to an operating system. For instance, capacitance is adjusted so that totem 36 falls within a defined range of capacitances that reduce the logic stack associated with sorting between totem touches and other touches at a touchscreen display. In one embodiment, an operating system communicates through a wireless interface or other communication medium to adapt capacitance of totem 36 feet. For instance, a touch controller provides the operating system with detected totem capacitance levels so that the operating system commands changes to the active capacitance that places totem 36 within totem detection capacitance range 108. In one example embodiment, an operating system helps a touch controller track multiple totem devices by ensuring that each totem has a unique capacitance pattern at the touch device. In another example embodiment, an operating system helps a touch controller track totem inputs by changing active capacitance to define the type of user interface that the totem is associated with. For instance, if a totem is associated with a rotational user interface, the operating system may set a capacitance level for one of the feet that the touch controller references when reporting an X-Y coordinate for the totem position. As an alternative, with a linear user interface, the operating system may set a capacitance with a central location that the touch controller reports as a position while leaving feet on the totem perimeter at a reduced capacitance. In other alternative embodiments, logic on a processor within totem 36 may adjust capacitance based upon conditions sensed at the totem 36. For example, a rotation sensor 66 that detects light at the bottom of totem 36 may provide an indication of totem 36 resting onto or lifting off of a surface so that active capacitance can be adjusted to aid touch device detection of the totem and to save battery when not in use. As another example, a touch sensor integrated in the totem may command capacitance adjustment based on whether an end user is touching the totem.

Figure 11:
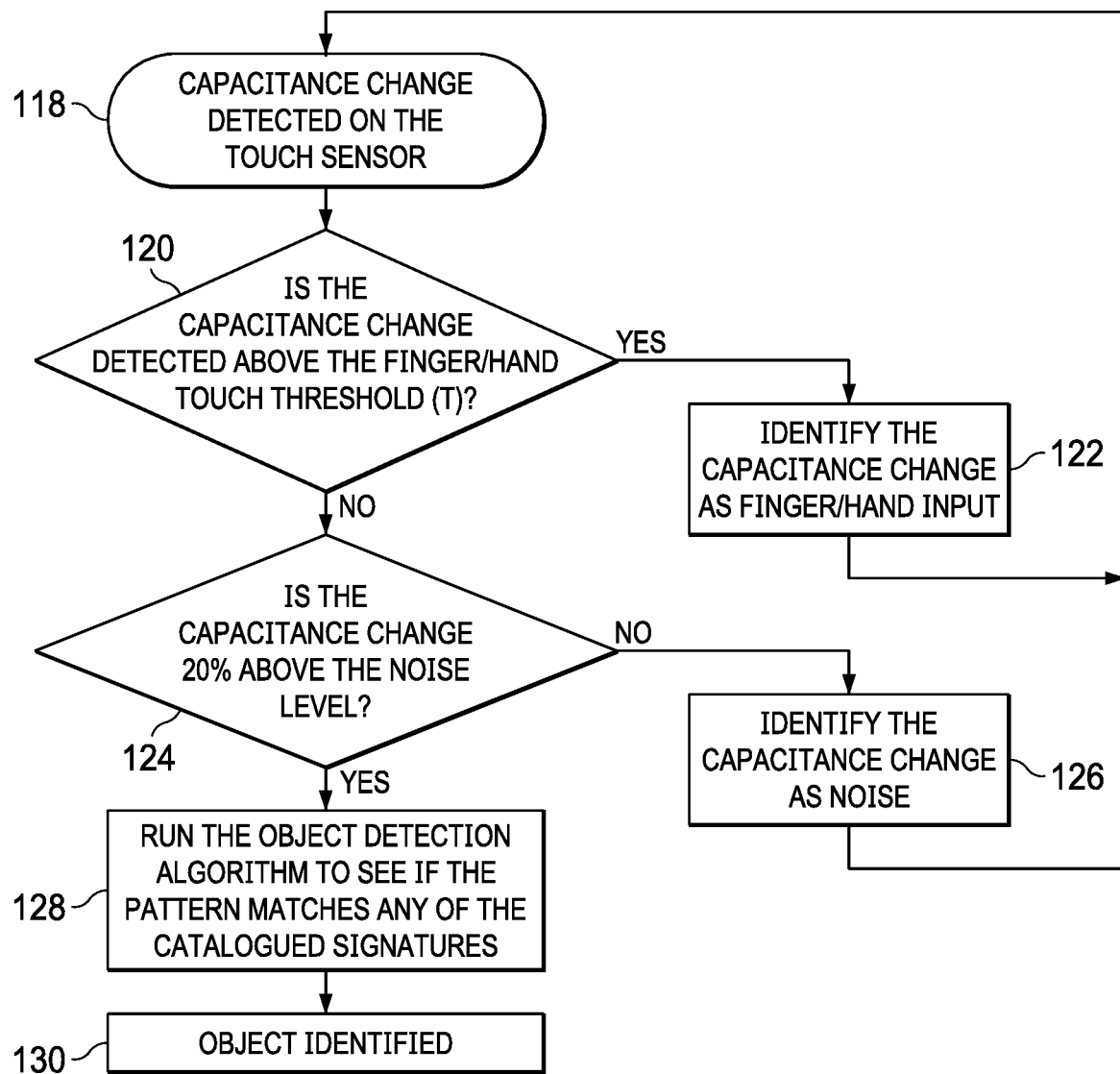
FIG. 11 depicts a flow diagram of a process for detecting a totem at a touchscreen display with a search based upon capacitance level.

Referring now to FIG. 11, a flow diagram depicts a process for detecting a totem at a touchscreen display with a search based upon capacitance level. The process starts at step 118 with detection of a capacitance change detected at the touchscreen display. At step 120, a determination is made of whether the capacitance level associated with the capacitance change falls above or below the finger touch threshold 106, and, if the capacitance exceeds the threshold the process continues to step 122 to identify the capacitance change as finger or hand touch that is analyzed with a finger touch algorithm. If at step 120 the detected capacitance level falls below the finger touch threshold, the process continues to step 124 to determine if the detected capacitance falls within the totem detection capacitance band 108, such as below the finger touch threshold and at least 20% above the noise threshold. If the detected capacitance falls outside of the totem detection capacitance band 108, the process continues to step 126 to identify the capacitance change as noise. If at step 124 the detected capacitance falls within a range expected for a totem, the process continues to step 128 to perform a totem recognition algorithm. For example, all touches at the touchscreen display that fall within the totem capacitance band are compared against known totem touch patterns to identify any available matches. If a match exists at step 128, the process continues to step 130 to identify the totem type and report the totem to the operating system. If no match is found, the touch controller attempts to identify any other objects that may be associated with the touch with other identification algorithms. Since the totem capacitance band falls below the finger touch threshold, the touch identification algorithm may discard the touch as noise if no object is associated with the touch.

Figure 12:
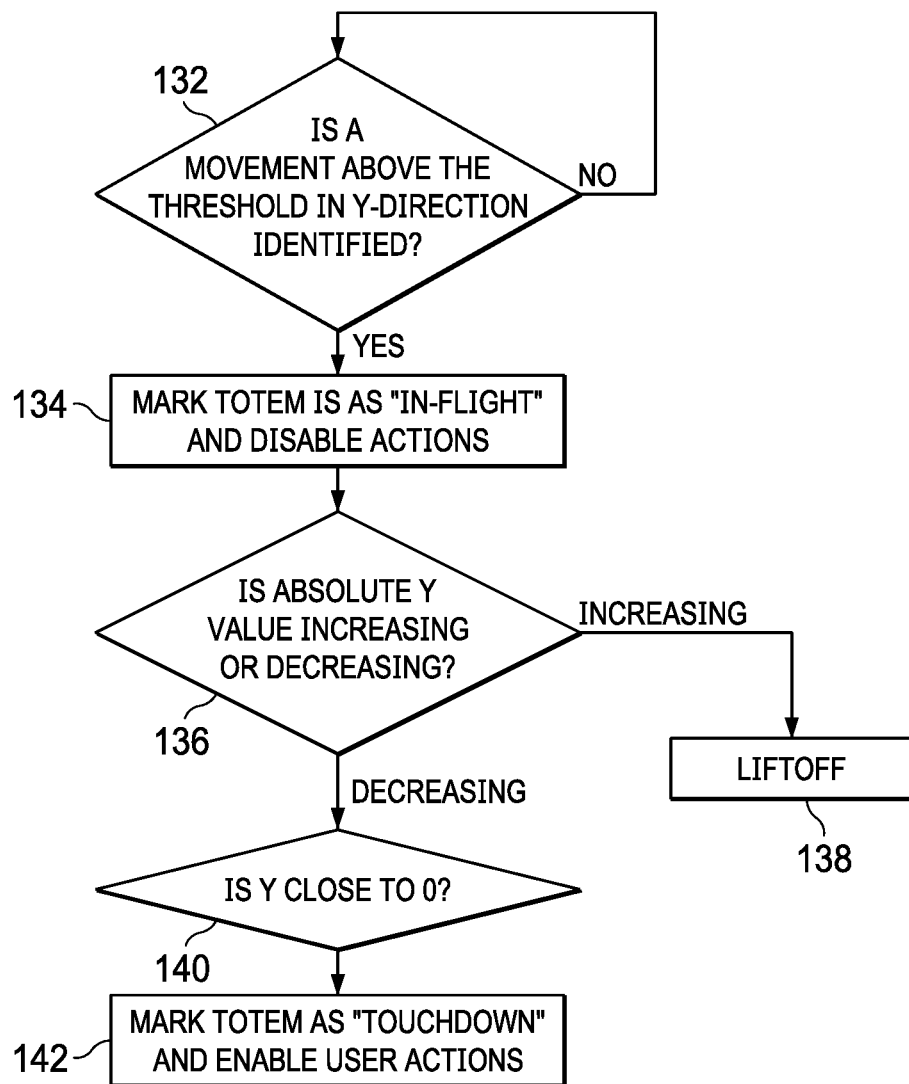
FIG. 12 depicts a flow diagram of a process for identifying a totem touchdown and liftoff by leveraging an optical rotation sensor in the totem.

Referring now to FIG. 12, a flow diagram depicts a process for identifying a totem touchdown and liftoff by leveraging an optical rotation sensor in the totem. The process starts at step 132 with monitoring of the optical rotation sensor to detect a change in distance in a Y axis, such as would indicate vertical movement of the totem relative to a resting surface. Once an increase in distance is detected, the process continues to step 134 to mark the totem as "in flight" and to disable totem actions. At step 136, a determination is made of whether the Y axis distance is increasing, such as with a liftoff indicated at step 138, or decreasing such as with a placement on a surface as indicated at step 140. If the Y axis distance is decreasing, a determination is made at step 140 of a predetermined range to the resting surface that indicates placement is almost complete. Once the totem approaches the surface, at step 142 the totem is placed in touchdown mode to enable user actions. In one example embodiment, transition to touchdown mode may include use of a unique active capacitance pattern that aids the touch controller in identifying the totem.

Figure 13:
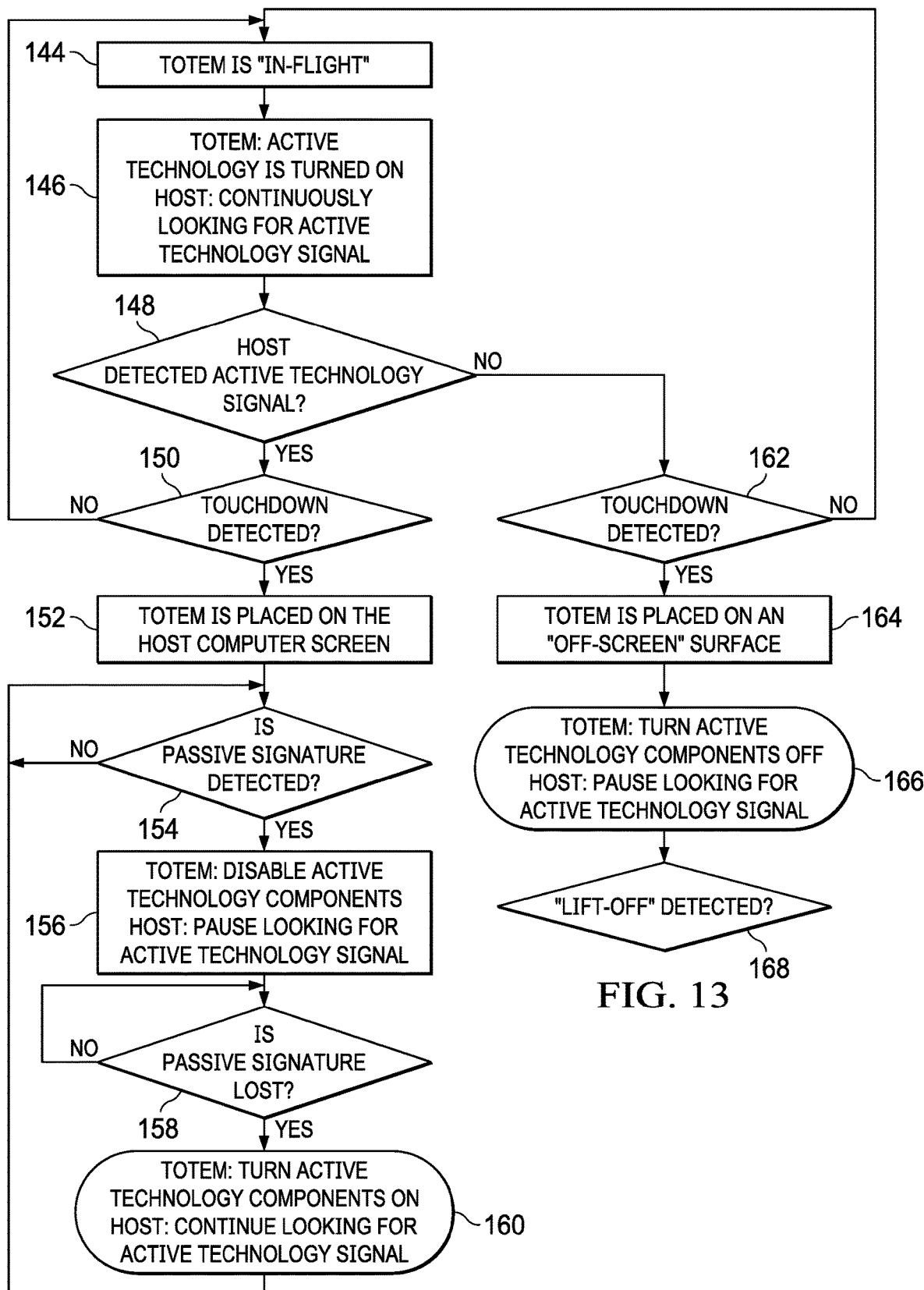
FIG. 13 depicts a flow diagram of a process for applying active capacitance of totem feet to detect and track a totem.

Referring now to FIG. 13, a flow diagram depicts a process for applying active capacitance of totem feet to detect and track a totem. The process starts at step 144 when a totem "in flight" status is detected. For example, in flight status may be determined from vertical accelerations or detection of an increase in distance by an optical encoder having a primary function of detecting totem rotation to report rotation to an information handling system, such as with a wireless communication that sends totem orientation information as rotation is detected. At step 146, while the totem is in flight, active capacitance is turned on to aid the touchscreen and host system in scanning the touch surface to detect a totem touchdown. Turning active capacitance on in flight provides the touchscreen and host with both the totem foot signature and the totem active capacitance signature so that detection of both indications of a totem reduces the risk of a false totem detection. In one example embodiment, for instance, a totem in flight that is placed only partially on a touchscreen offers an active signature for recognition so that an incomplete foot touch pattern is not mistaken for a finger or other touch input. The process continues to step 148 to determine if the host detects any active capacitance signals of the totem in order to determine that a totem is approaching to the screen. If active capacitance signals of the totem are not detected by the host, the process continues to step 162 to await totem touchdown and then to step 164 to determine if the totem touchdown took place at an off-screen location. If the totem is placed off screen so that detection by the touchscreen display does not occur, then at step 166 the totem active capacitance is placed off and the host scanning for the totem is paused until, at step 168 a lift off is detected.

If touchdown is detected at step 150, the process continues to step 152 to determine that the totem is on the host touch detection surface. At step 154, a determination is made of whether the totem passive foot signature is detected by the touch controller with the host device scanning for the totem for a predetermined time period. In one embodiment, active capacitance is applied to increase the capacitance presented at the touch devices, such as to a level just below the finger touch threshold. Once the passive foot pattern is detected, the process continues to step 156 at which the active capacitance is disabled and the touch controller is commanded to attempt to track the totem without active capacitance provided to the totem feet. At step 158, passive capacitance is maintained at the feet as long as the touch controller continues to track the totem. If at step 158 touch detection of the totem is lost, the process continues onto step 160 to turn on active capacitance and initiate host device scan based upon the active capacitance. Communication between the totem, touch controller and host system to support control of active capacitance as set forth above may be provided by a wireless medium, such as Bluetooth, or other communication medium. In one example embodiment, iterations between step 160 and 154 to set active capacitance may be performed incrementally so that the touch controller can target a specific capacitance level for tracking the totem, including identification of multiple totems by each totem's active capacitance level.

Figure 14:
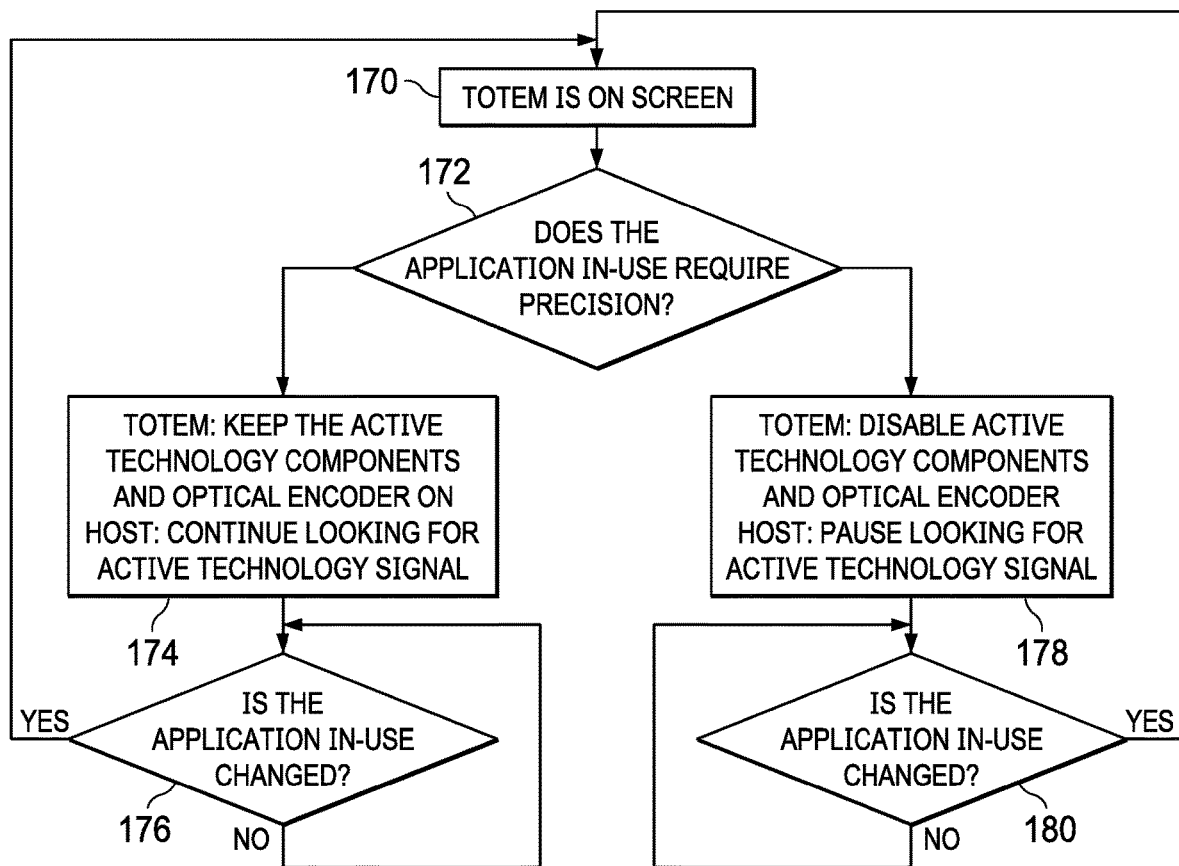
FIG. 14 depicts a flow diagram of a process for continuous monitoring of a totem on a touch detection device.

Referring now to FIG. 14, a flow diagram depicts a process for continuous monitoring of a totem on a touch detection device. The process starts at step 170 with a totem on the touch device tracked by the touch controller. At step 172, a determination is made of whether the operating system or application using the totem needs high resolution touch detection. If yes, the process continues to step 174 to turn on or maintain active capacitance at the totem feet and monitor totem orientation with the optical encoder. The active capacitance provides the touch controller with a more accurate position determination of the totem. At step 176, active capacitance is maintained while the application has a high accuracy mode and the end user is engaged with the totem. If at step 172 a precision application is not in use, the process continues to step 178 to disable the totem active capacitance and optical encoder. The touch controller tracks the totem based upon the passive capacitance level of the totem feet. At step 180, the totem remains in the lower accuracy passive capacitance mode until the application use changes to a high accuracy mode.

Figure 15:
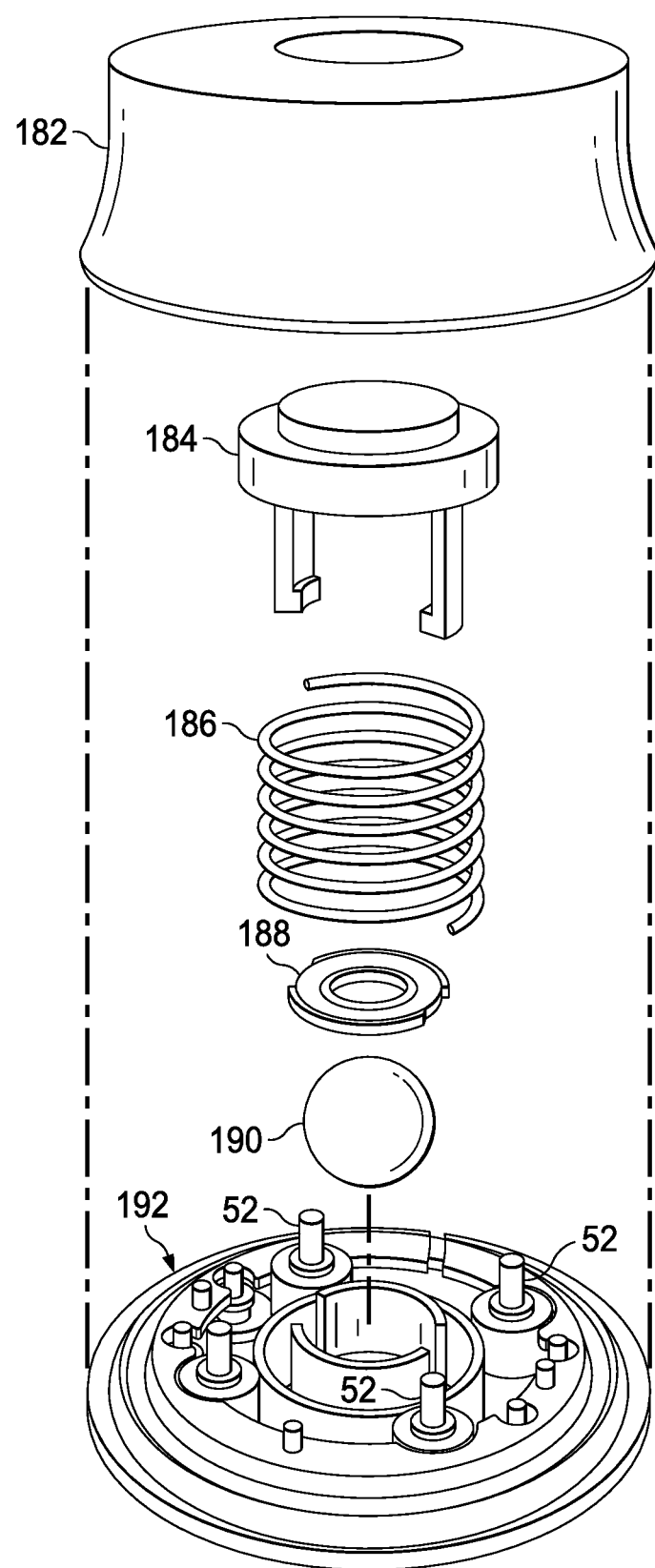
FIG. 15 depicts an exploded view of a totem having dynamic friction adjustment.

Referring now to FIG. 15, an exploded view depicts a totem 36 having dynamic friction adjustment. In the example embodiment, plural feet 52 integrate with a base housing assembly 192 to provide a touch pattern for totem 36 on a touch detection device, such as touchscreen display. A rotating ball 190 fits in an opening of base housing assembly 192 to contact the touch detection surface. For example, ball 190 extends out of the bottom surface of base housing assembly 192 for a sufficient distance to contact and rotate against a support surface while allowing the bottom surface of base housing assembly 192 to also remain in contact with the support surface. A retention cap 188 rests over ball 190 to maintain ball 190 in position within a plunger spring 186 and a brake release plunger 184 having a push button that extends out of an opening of a top housing cap 182. In the example embodiment, pressing down on plunger 184 releases ball 190 to rotate freely so that totem 36 will move across a support surface. Releasing plunger 184 into an upward position locks ball 190 to restrict rotation so that totem 36 has frictional resistance against a sliding movement along a support surface. For example, a force applied against ball 190 generates sufficient force to prevent rotation of the ball even if the ball is forced by totem sliding to slide across the touchscreen display. In alternative embodiments, other types of actuators may be used to selectively lock and release ball 190, such as a solenoid that presses against ball 190 to increase friction and releases ball 190 to decrease friction, or an electric step motor that selectively engages with ball 190 to hold ball 190 in place. In one example embodiment, an actuator may respond to Bluetooth commands from a host information handling system to engage friction that holds totem 36 in place, release friction to allow totem 36 to move or even move totem 36 on the touch detection surface by engaging the actuator to rotate ball 190. For instance, the actuator may be a haptic device that serves a dual purpose of providing haptic feedback and controlling a position of ball 190. In the case of a step motor, rotation of ball 190 by movement of totem 36 provides step movement of the step motor so that rotation of the ball may be monitored by counting steps. Remote commands to the step motor, such as through a wireless interface, may permit movement of totem 36 by the step motor without an end user touch. In one alternative embodiment, the actuator may interface with a processor in totem 36 to selectively engage based upon accelerations sensed by an accelerometer, such as might indicate an involuntary movement of totem 36 due to a tilting of the touch detection surface.

Figure 16:
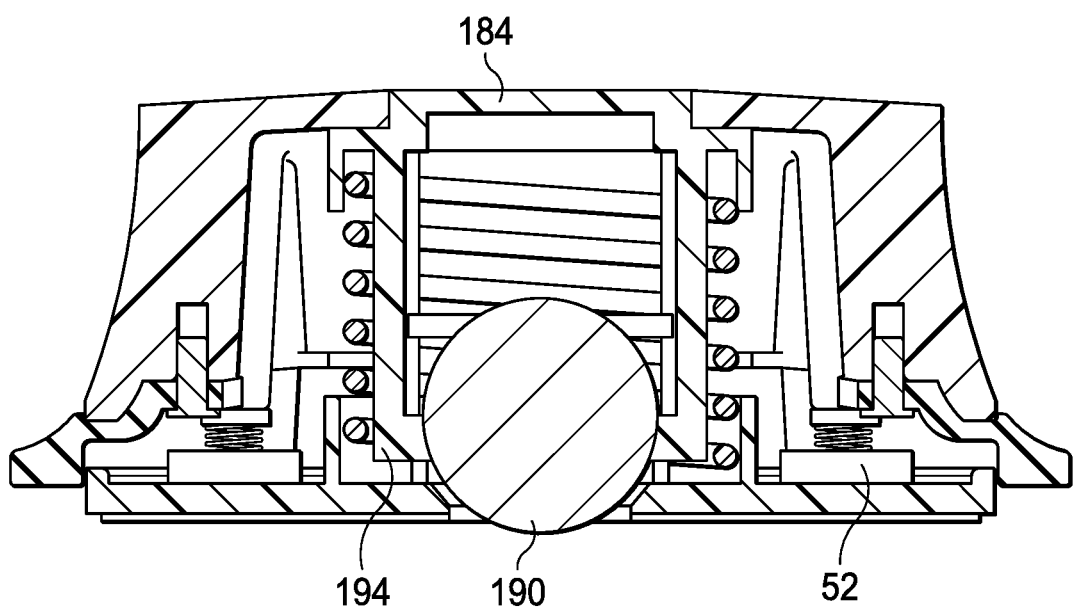
FIG. 16 depicts a side cutaway view of a totem having a rotating ball in a locked position that supports rotation of the totem about a rotation axis in a fixed location on the touchscreen display.
Figure 16:
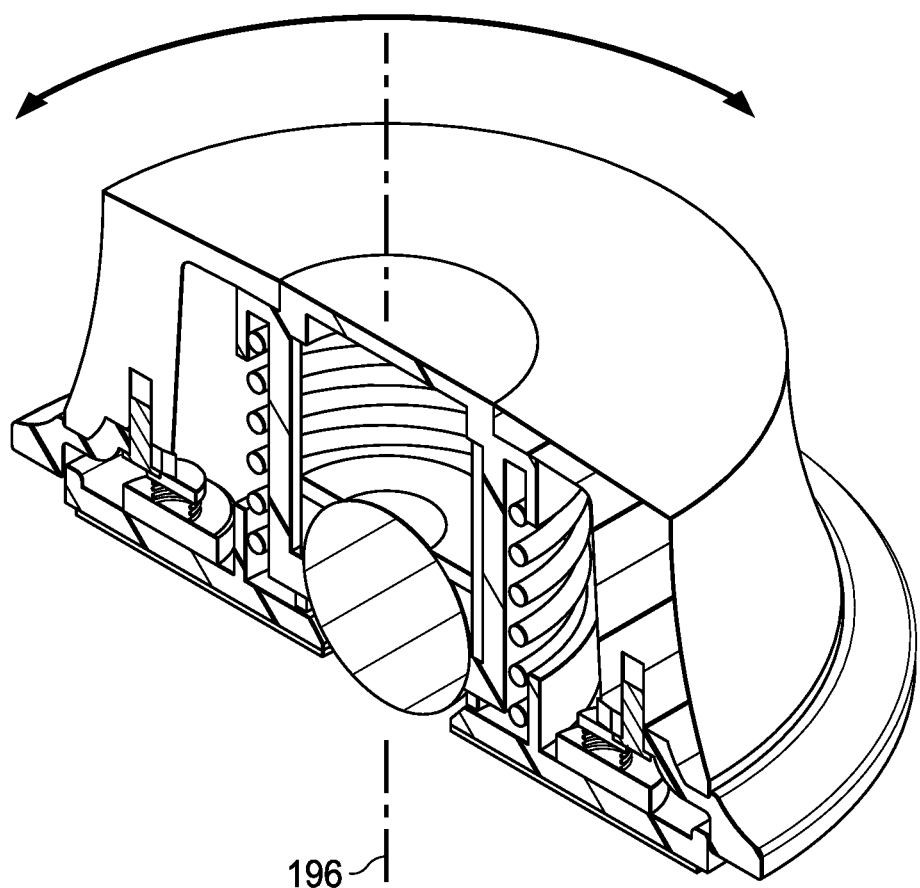

Referring now to FIG. 16, a side cutaway view of totem 36 depicts rotating ball 190 in a locked position that supports rotation of totem 36 in a fixed location. In the example embodiment, plunger 184 is biased to a raised position by spring 186 to raise side arm members 194 upwards relative to ball 190 so that side arm members 194 press against the outer diameter of ball 190. Pressure by side arm members 194 against ball 190 creates friction that works against rotation of ball 190, thus maintaining totem 36 in place. For example, ball 190 is made of thermoplastic that has a sufficient coefficient of friction working against a support surface to prevent totem 36 from sliding. However, totem 36 will rotate about a central axis 196 with rotating ball 190 secured in place, such as to use totem 36 with a rotational user interface. Although the example embodiment depicts a single friction setting with side arm members 194 raised against rotating ball 190, in alternative embodiments, the amount of force applied against ball 190 may vary so that the frictional resistance working against rotation of ball 190 is adjustable. For instance, a solenoid actuator might increase pressure against ball 190 if the support surface tilts and an accelerometer in totem 36 detects motion. Similarly, a solenoid actuator may release friction if a capacitive sensor integrated in the totem detects an end user grasp of the totem. In one embodiment, an initial release of friction permits some movement as an end user grasps the totem and then allows full movement as an accelerometer detects movement induced by the end user. By selectively varying friction applied against ball 190, totem 36 avoids undesired movements but responds without resistance when motion is initiated by an end user. In this manner, a totem 36 on a heavily tilted support surface remains in place with friction working against ball 190 unless motion is desired by an end user as indicated by the end user's touch.

Figure 17:
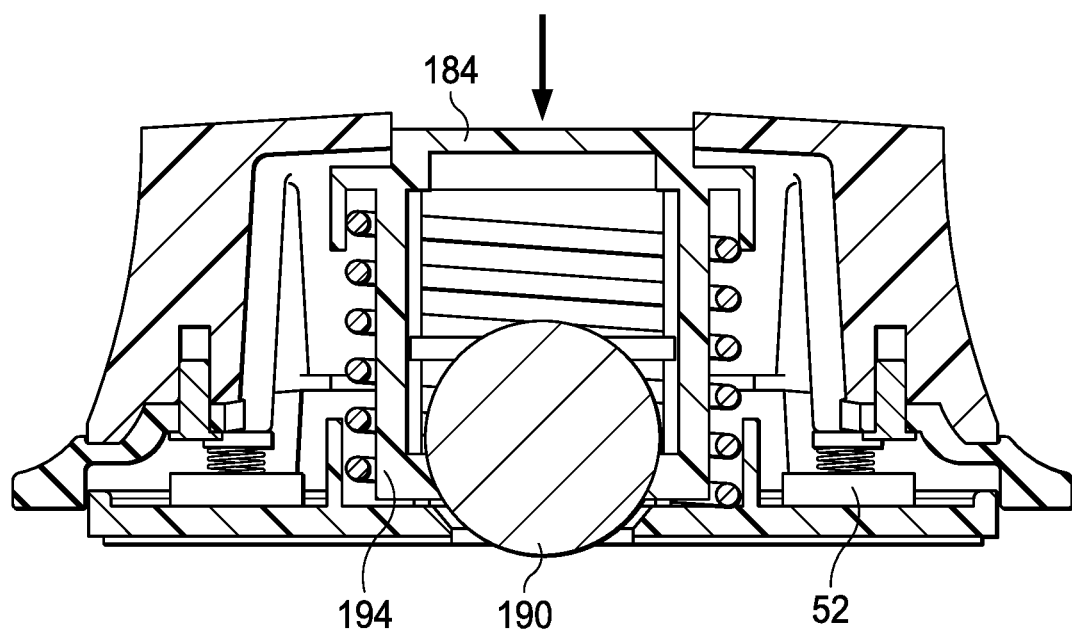
FIG. 17 depicts a side cutaway view of the totem having the rotating ball in a released position that supports linear motion of the totem on a touch surface.
Figure 17:
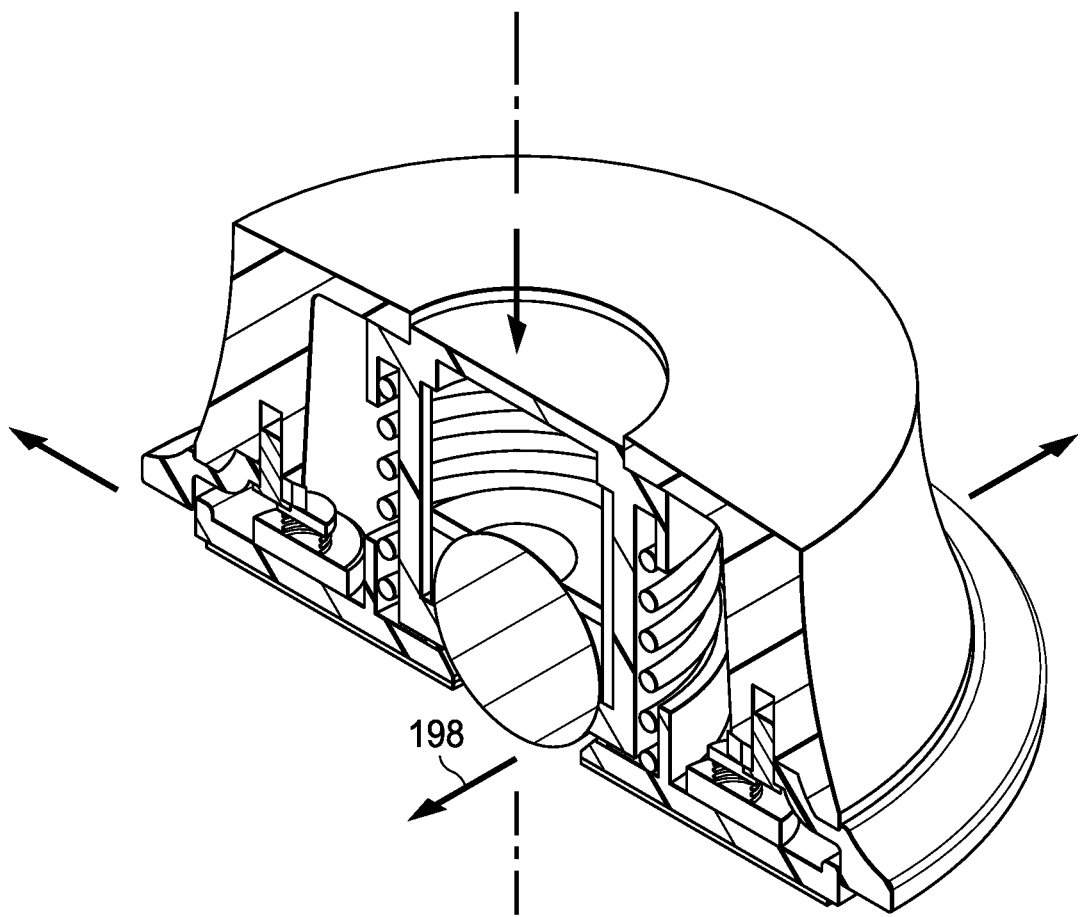

Referring now to FIG. 17, a side cutaway view of totem 36 depicts rotating ball 190 in a released position that supports linear motion of totem 36 on a touch surface. Plunger 184 is pressed downward to push side member arms 194 down and engaged with a lip formed in base housing assembly 192. With side member arms 194 pressed downward, ball 190 rotates without engaging side member arms 194 so that friction operating against ball 190 is reduced. Without friction operating against ball 190, an end user may slide totem 36 across both linear axes of a support surface while ball 190 rotates within totem 36. When an end user desires to hold totem 36 in place, the end user presses down on plunger 184 for a second time to release side arm members 194 from base housing assembly 192 to bias upward by spring 186 and press against ball 190.

Figure 18:
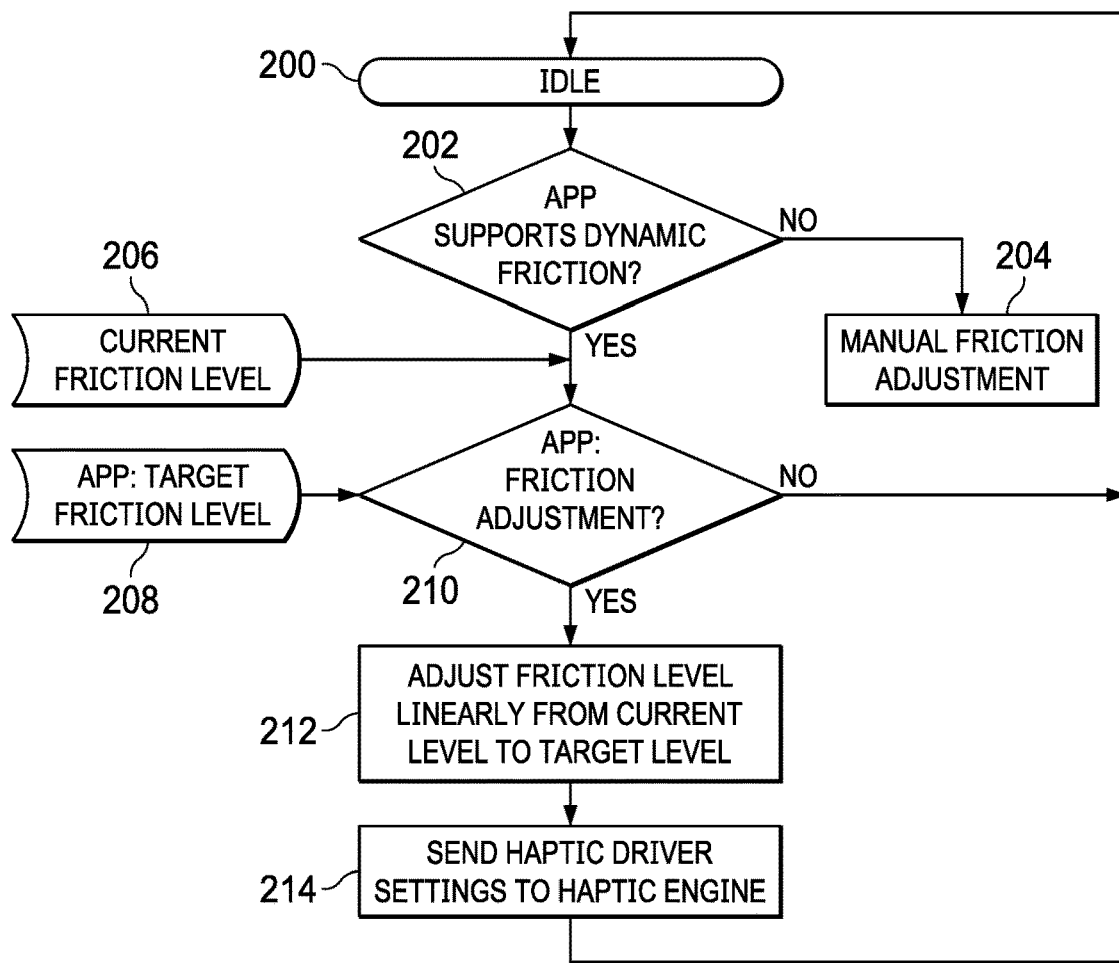
FIG. 18 depicts a flow diagram of a process for adjusting friction at a totem with commands from a host information handling system.

Referring now to FIG. 18, a flow diagram depicts a process for adjusting friction at a totem 36 with commands from a host information handling system 10. The process starts at step 200 and continues to step 202 to determine if the totem supports dynamic friction commanded from the information handling system, such as with a wireless communication from the information handling system to the totem to determine its capabilities. If the totem does not support dynamic friction adjustment, the process continues to step 204 for manual friction adjustment, such as a push button on the totem as describe above. If dynamic friction adjustment by a host is supported, the process continues to step 206 to inquire the existing friction setting of the totem, and to step 210 to determine if the host should command a host-based friction adjustment to the totem. At step 208, the host information handling system, such as an application or operating system interfaced with the totem through wireless communications, provides a target friction level to the totem. The target friction level may be based upon an end user preference, a user interface associated with the totem, accelerations sensed at the totem, touches sensed at the totem, or other factors. For example, a high target friction level may be set if totem 36 is associated with a rotational user interface so that totem 36 rotates but does not move linearly. As another example, totem friction level may be set in proportion to accelerations sensed by the totem due to touchscreen display tilt. Similarly, totem friction level may be set based upon a sensed touch by an end user at the totem, such as may be determined by a capacitive sensor in the totem or by palm touches on the touchscreen display. At step 212, the friction level is adjusted to the target level at the totem. At step 214 a haptic driver setting is provided to the totem haptic device where the haptic device manages frictional force applied against the rotating ball.

Figure 19:
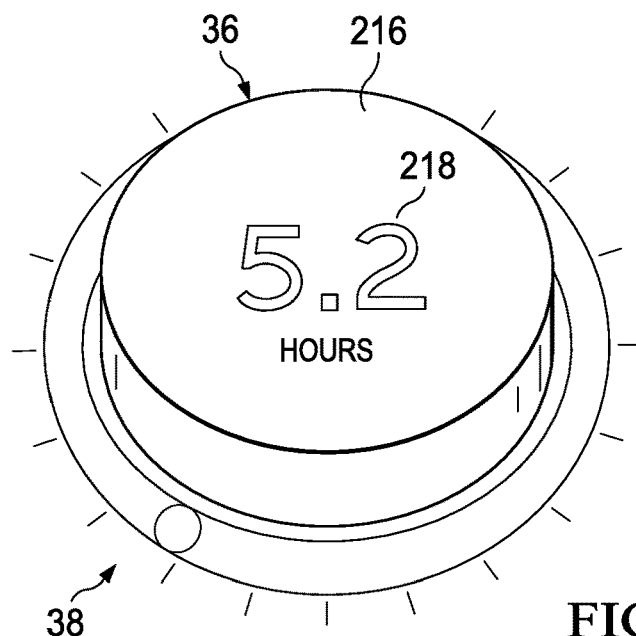
FIG. 19, an upper perspective view depicts an example totem embodiment having an interactive upper surface.

Referring now to FIG. 19, an upper perspective view depicts an example totem embodiment having an interactive upper surface. In the example embodiment, totem 36 rests on a touchscreen display 26 that presents a dial rotational user interface 38. An OLED touchscreen display 216 integrates with the upper surface of totem 36 to present a value, depicted in the example as a numerical value of 5.2 hours (annotated as element 218), matching the input selected by the end user with the rotation of totem 36 on touchscreen 26 relative to dial rotational user interface 38. In the example embodiment, presentation of the numerical value at display 216 is supported from a host information handling system, which drives totem display 216 as a second system display, such as by sending pixel values through a wireless interface. In alternative embodiments, totem display 216 may be an LED display or other less complex display device that is driven to present visual images with processing resources of the totem. For example, the host operating system communicates the numerical value to totem 36 by a wireless communication and a graphics processor on totem 36 generates the visual image. In alternative embodiments described below in greater depth, totem 36 may include an opening and/or lens structure that presents visual images at the upper surface forwarded from visual images presented at the supporting surface touchscreen display 26. In another alternative embodiment, the touchscreen 216 accepts end user inputs to interact with the host information handling system. For instance, tapping on "hours" presented on totem 32 changes the numerical presentation to a minute scale. In addition to having an integrated display present visual images at the totem upper surface, a folded display may also present visual images along the vertical sides of totem 36.

As an example of interactions supported by a totem 36 display 216, an end user viewing a CAD drawing on a touchscreen display 26 may interact with the CAD drawing content with selections of content made by placement of totem 36 over the content. For instance, a user examining a schematic drawing who wants to investigate details at a portion of the schematic drawing may place totem 36 over the portion of interest to command a zoomed view of that portion at a different location of the touchscreen display 26. In one embodiment, totem 36 is a ring having a central open portion that allows direct viewing by the end user of the selected portion within the ring opening while the zoomed view is presented elsewhere. In an alternative embodiment, totem 36 display 216 presents an interactive menu that the end user touches to control the zoomed view of content selected by placement of the totem. Communication between the totem and information handling system is, for instance, supported by a wireless medium that sends touch information for touches at the totem upper surface to the operating system for interpretation. For example, the operating system receives totem positions from the touch controller and applies the totem position on the touchscreen display to determine the portion of the content of the touchscreen display to which inputs at the totem upper surface apply. In various embodiments, the operating system dynamically adapts input methods between the interactive totem upper surface and the touchscreen display touch surface to customize input events and change input paths as end user HID events shift between varying degrees of input accuracy.

Figure 20:
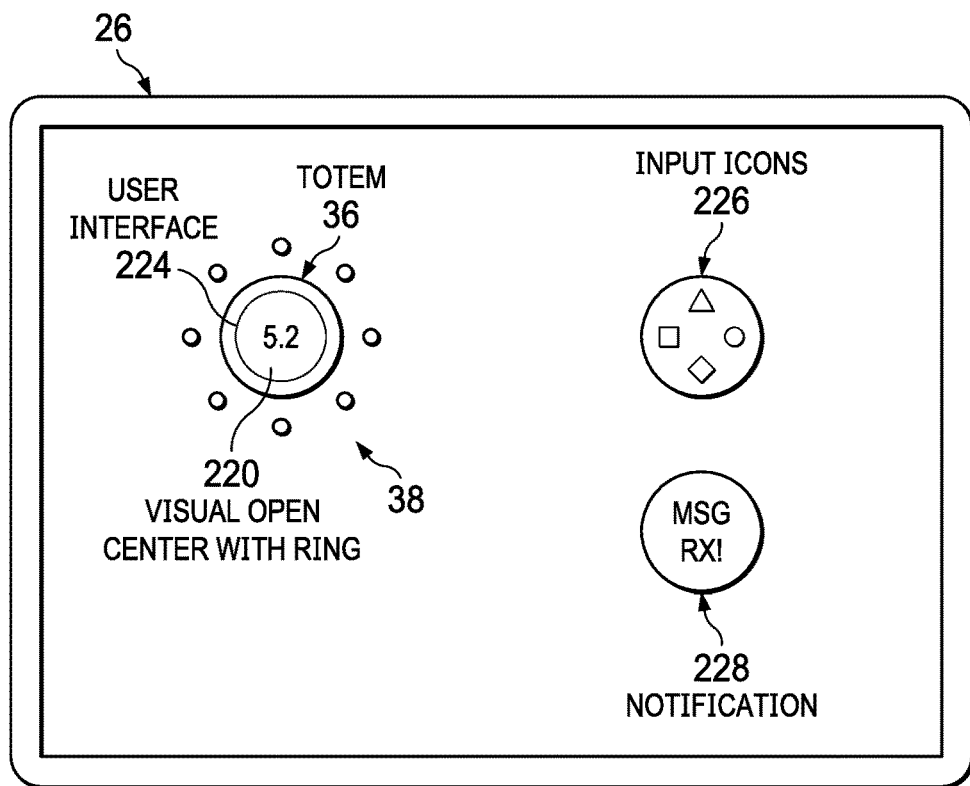
FIG. 20 depicts an upper view of a touchscreen display having plural totems disposed on it to illustrate a variety of interactions viewed by an end user at a totem upper surface.

Referring now to FIG. 20, an upper view of a touchscreen display having plural totems disposed on it illustrates a variety of interactions viewed by an end user at a totem upper surface. In the example embodiment, a first totem 36 has a ring configuration with a visual access open center 220 that provides a direct view of the numerical value 5.2 presented by touchscreen display 26 through the center opening. A user interface 224 is defined at visual access opening 220 based upon touch detection by touchscreen display 26 of the perimeter of totem 36 so that information related to rotational user interface 38 is visible. Another totem 36 presents input icons 226 on an upper surface that an end user can select to perform functions associated with the totem. As an example, input icons 226 can assign functions to totem inputs, such as copy, cut and paste operations. Input icons 226 may manage totem input scale, resolution, haptic feedback, friction adjustment, power use or other settings. Another totem 36 presents a notification user interface 228 that issues notifications from the operating system or applications. For example, system level notifications may include power or battery status, software updates, email alerts, messaging alerts or other information of relevance to an end user. Presenting visual cues at the totem upper surface reduces clutter on the desktop by using space where the totem rests over the display viewing area.

Figure 21:
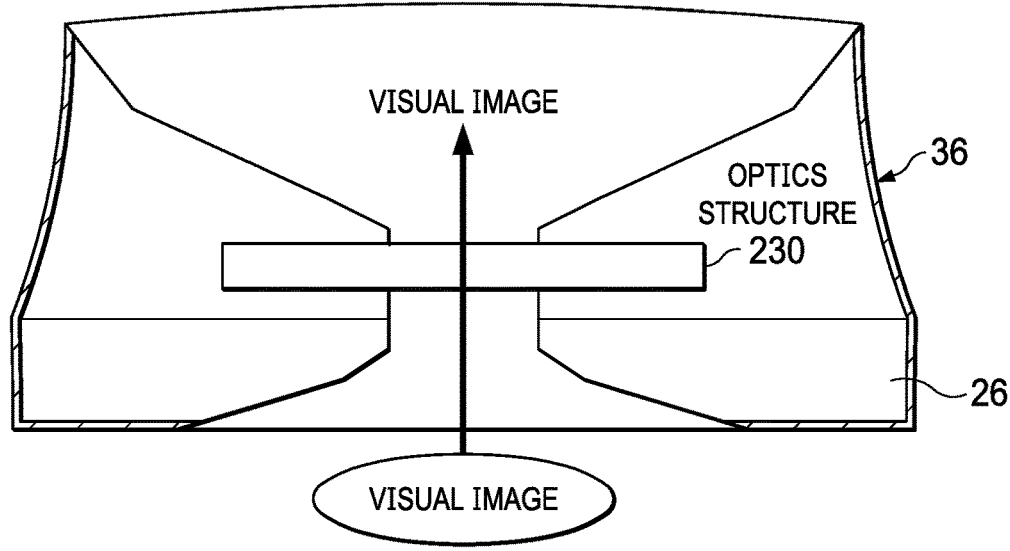
FIG. 21 depicts a side cutaway view of an example embodiment of a totem that presents visual information that passes from an underlying display and through the totem to the totem upper surface.

Referring now to FIG. 21, a side cutaway view depicts an example embodiment of a totem that presents visual information that passes from an underlying display and through the totem to the totem upper surface. In the example embodiment, a visual image presented a display 26 passes through an optics structure 230 to present as the visual image at the upper surface of totem 36. The host information handling system determines a position under the totem that aligns with optics structure 230 so that illumination from display 26 is focused for viewing at totem 36 upper surface. The host information handling system generates the visual image with a resolution and size adapted to pass through optics structure 230, such as can then present across substantially all of the totem upper surface. In one alternative embodiment, optics structure 230 may include three dimensional optics that adapts the visual image from display 26 for presentation at totem 36 upper surface as a three dimensional visual image or a holographic image.

Figure 22:
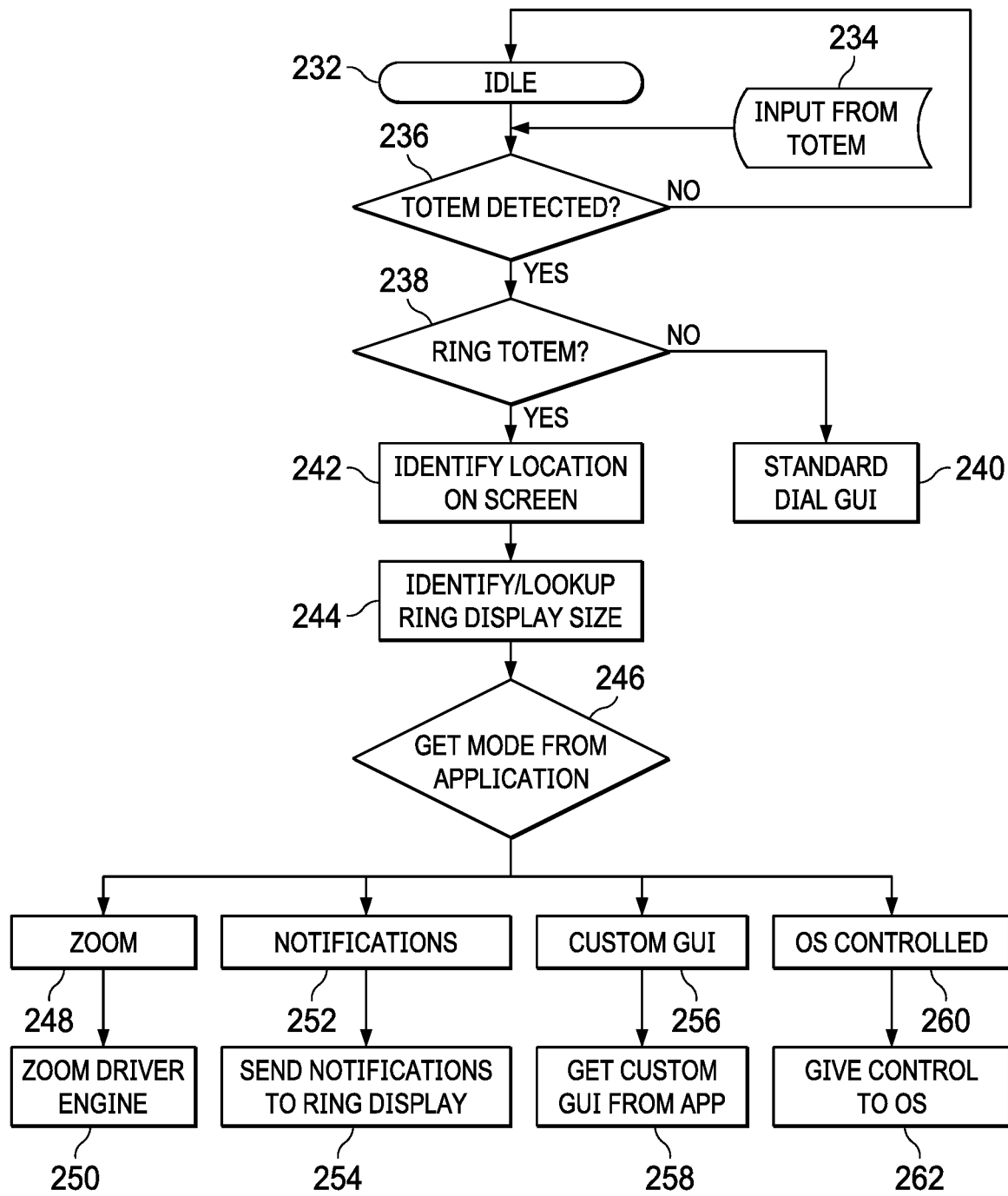
FIG. 22 depicts a flow diagram of a process for presenting visual information from a display at a totem.

Referring now to FIG. 22, a flow diagram depicts a process for presenting visual information from a display at a totem. The process starts in an idle state at step 232 and at step 234 receives an input as a touch from a totem at a touchscreen display. At step 236 a determination is made of whether the touch was a totem and, if not, the process returns to an idle state at step 232. If at step 236 a totem is detected, the process continues to step 238 to determine if the totem is a ring totem having a visual access opening to present a visual image. If not, the process ends at step 240 by presenting a standard dial rotational graphical user interface around the totem. If at step 238 the totem is determined to have a visual access opening that supports a user interface presentation, the process continues to step 242 to determine the totem location on the touchscreen display. At step 244, the size of the totem display area is determined either based upon touches showing the ring perimeter or a look up of the display area based upon the totem type.

Once a totem type and display area is determined, the process continues to step 246 to get the application mode selected for the presentation at the totem. If a zoom mode is selected, the process continues to step 248 and at step 250 a zoom driver engine is engaged. For example, the zoom drive presents the content from under the totem at a zoomed resolution away from the totem, such as in a separate window. The zoom driver accepts rotational inputs from the totem to adjust the zoom level and otherwise interact with the zoomed content. Within the totem, the zoomed content is presented at the totem upper surface or inner ring so that the end user's view of the display content is not disrupted by the presence of the totem over the content. If at step 246 a notification mode is selected, the process continues to step 252 and step 254 to send notifications to the ring portion of the totem for presentation within the totem ring interior or at the totem surface. An end user may cycle through multiple notifications presented at the totem by rotating or sliding the totem. In one embodiment, the totem transitions to notifications as notifications are reported to the information handling system and performs other functions after the notification is presented. If at step 246 the application mode selected for the totem is a custom user interface, the process continues to step 256 and 258 to get the custom user interface from the application. For example, an application programming interface defined for the totem allows applications to select content for presentation at the totem. As an example, a game might present a score in the totem ring and highlight scoring with a celebratory notification. If at step 246 an operating system controlled mode is selected, the process continues to step 260 and 262 to place control of the totem display area with the operating system. For example, the operating system may present a series of icons at the totem display area that works with the totem to perform operating system functions, such as cut, copy and paste.

Figure 23:
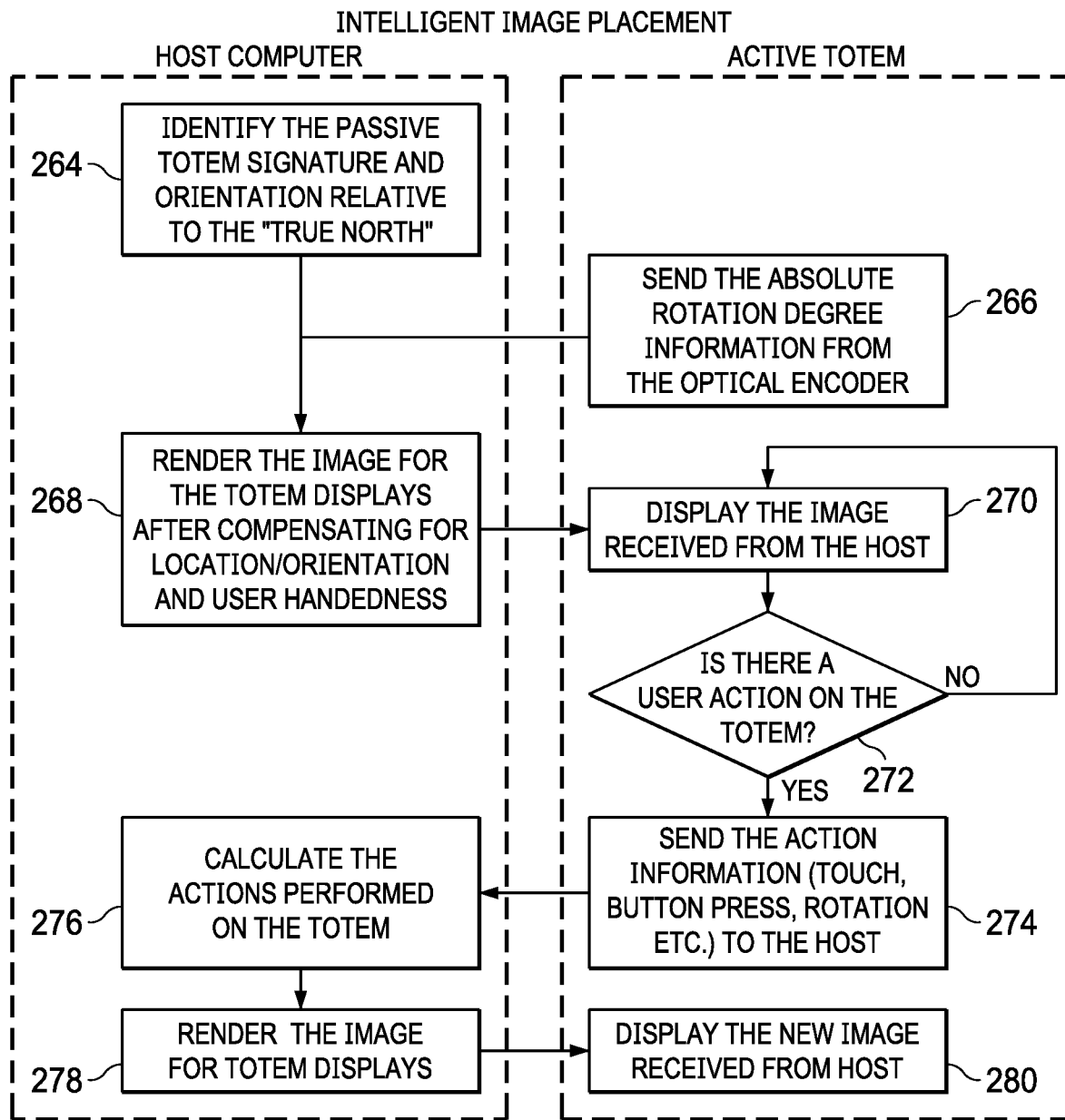
FIG. 23 depicts a flow diagram of a process for presenting images at a totem with a placement oriented for viewing by an end user.

Referring now to FIG. 23, a flow diagram depicts a process for presenting images at a totem 36 with a placement oriented for viewing by an end user. The process starts at step 264 with the host information handling system identification of a passive totem signature at a touchscreen display and the relative orientation of the totem, such as relative to a defined "north" of the touchscreen display. Totem signature and orientation detection is, for example, performed by comparing detected touches of totem feet at the touchscreen display with known totem feet configurations as set forth above. Alternatively, at step 266, an optical encoder within the totem determines orientation as an absolute number of degrees of rotation with a wireless communication from the totem to the information handling system. At step 268, the image presented at the totem is rendered with corrections provided for the totem rotational orientation and compensation for other factors, such as location of the totem on the display and user handedness. For instance, visual images at a totem may be presented slightly off a "north" orientation so that the end user view of the totem aligns with the visual images. If, for instance, an end user centrally located at the touchscreen display has a totem in an upper right corner of the display, the totem visual image may be tilted slightly to the right to align with the end user's gaze at the totem rather than the true north of the display. At step 270, the totem presents the visual image for the end user to view.

Once a visual image is presented at the totem, the process monitors the totem at step 272 to determine if a correction to the visual image is needed based upon an end user action at the totem, such as rotational or linear movement of the totem or an input touch made to the totem image. At step 274, the totem action information is sent from the totem to the host information handling system, such as a touch input at a totem capacitive surface or interactive button. At step 276, the host information handling system applies the input made at the totem to determine a response, such as may be defined by the operating system or an application that uses the totem through an application programming interface. At step 278, an image is rendered in response to the totem action for presentation at the totem. At step 280, the image is presented at the totem, such as with a wireless communication to the totem or presentation of new visual information under the totem ring's position.

Figure 24:
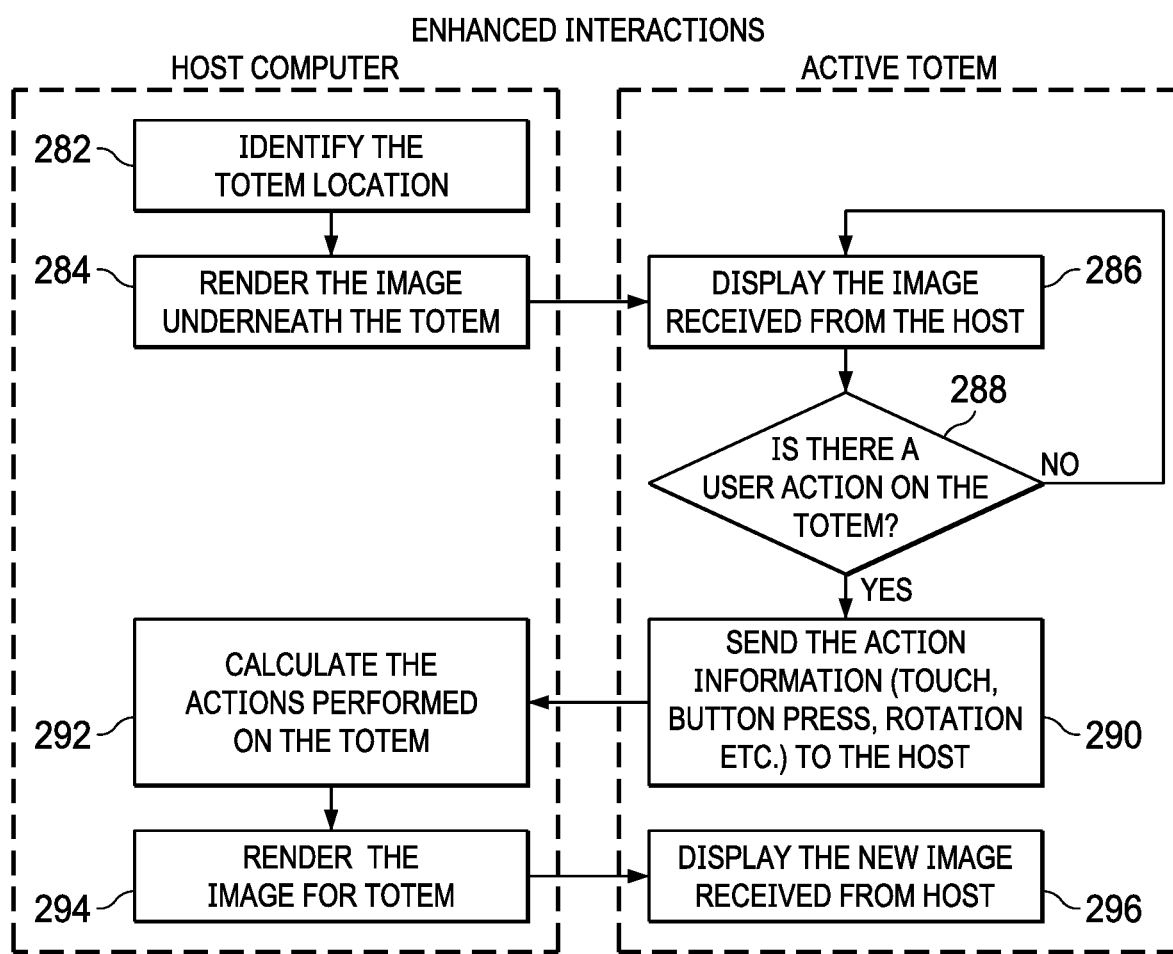
FIG. 24 depicts a flow diagram of a process for supporting enhanced totem interactions by communication between a host information handling system and totem.

Referring now to FIG. 24, a flow diagram depicts a process for supporting enhanced totem interactions by communication between a host information handling system and totem. The process starts at step 282 with identification by the host information handling system of the totem location on the touchscreen display and step 284 with rendering by the host information handling system of an image at the touchscreen display underneath the totem. At step 286, the visual image is presented at the totem, such as with an integrated totem display or through a visual access opening of the totem that brings the visual image upwards from the touchscreen display. At step 288, a determination is made of whether a user action is performed at the totem, such as rotational or linear movement or a touch at a capacitive surface or other interactive device. Upon detection of a user action, the process continues to step 290 to send the user action information to the host information handling system. At step 292, the host information handling system applies the input to determine an action performed at the totem and, at step 294 applies the action to render a responsive image for the totem action. At step 296, the new image is presented at the totem.

Figure 25:
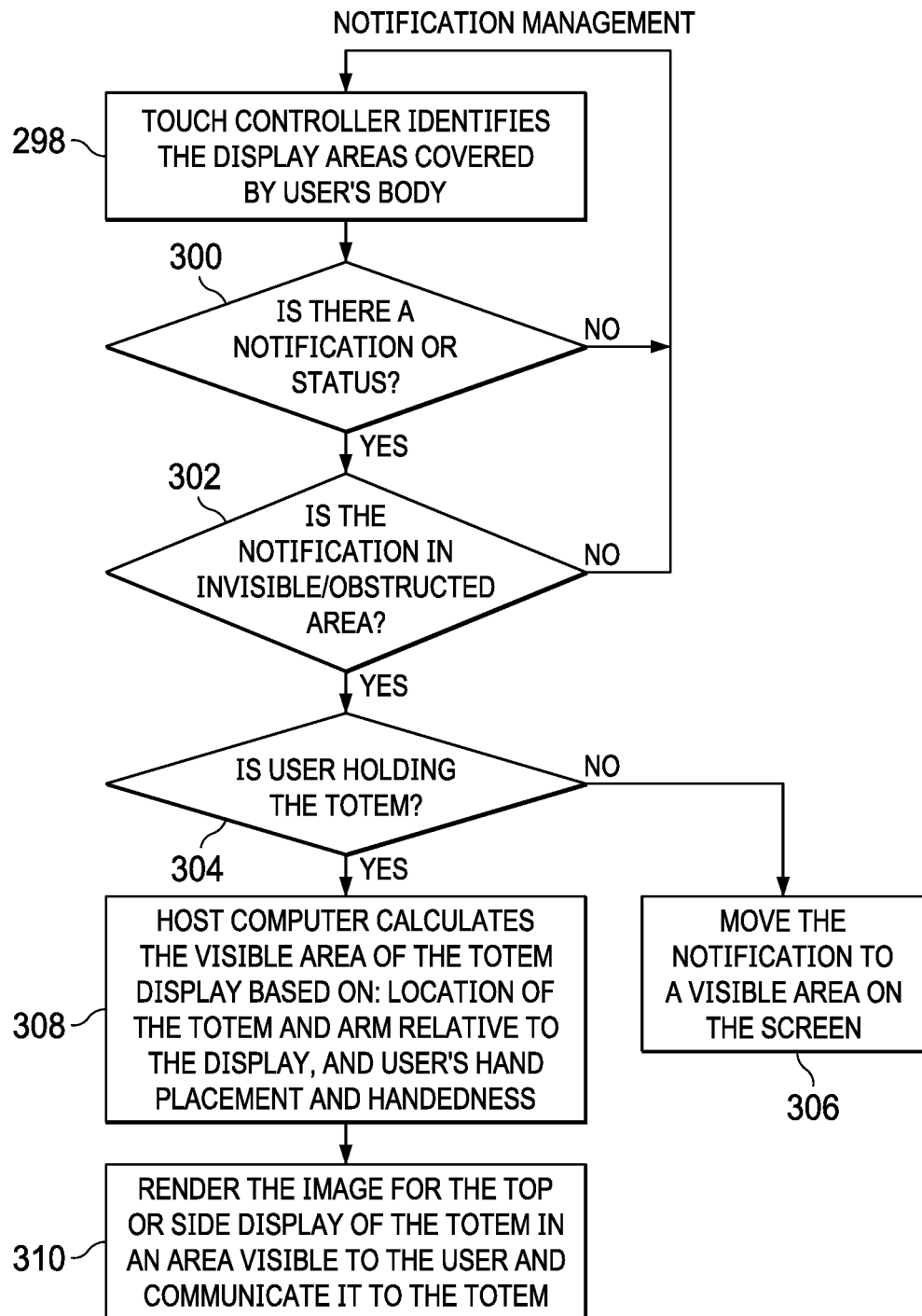
FIG. 25 depicts a flow diagram of a process for managing presentation of notifications at a totem.

Referring now to FIG. 25, a flow diagram depicts a process for managing presentation of notifications at a totem. The process starts at step 298 with a determination by the touch controller of touchscreen display areas covered by an end user's body, such as a palm or arm, or otherwise covered so that an end user cannot view images at the touchscreen display area. At step 300, a determination is made of whether a notification or related status change has taken place and, if so, at step 302 a comparison of the notification or status change is made against the covered touchscreen display area to determine an end user can see the notification. If normal viewing of a notification is available, the process returns to step 298 to continue monitoring notifications since the end user can view the notification without aid from the totem display area. If at step 302 a determination is made that the end user cannot view the notification, the process continues to step 304 to determine if the end user is holding or otherwise interacting with the totem in a manner that indicates a notification presented at the totem will have the end user's attention. If not, the process continues to step 306 to present the notification at a visible area of the touchscreen display area, such as based upon an end user's gaze. If at step 304 an end user has attention related to the totem, the process continues to step 308 for the host information handling system to determine a view presentation appropriate for the notification at the totem display area. For example, the host information handling system determines a presentation area based upon the portion of the totem display area that is visible, the location of the totem, the end user's touch interaction with the totem and the end user's handedness. At step 310, the visual image for the notification is presented at the totem in the determined area. In one example embodiment, a display integrated along the vertical side of the totem presents notifications to the end user while the upper portion of the display continues to present the functionality of the totem in active use by the end user.

Figure 26:
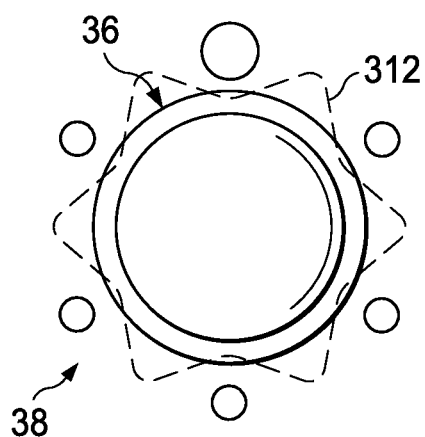
FIG. 26 depicts a top view of an example embodiment for haptic interactions supported during totem movements and with a totem user interface.

Referring now to FIG. 26, a top view depicts an example embodiment for haptic interactions supported during totem movements and with a totem user interface. In the example embodiment, totem 36 has a rotational user interface 38 with dots that align to value increments. A haptic device integrated in totem 36 provides a haptic response indicated by line 312 that mimics resistance to rotation of totem 36. For example, information handling system 10 tracks rotation of totem 36 by orientation of its feet or with an optical encoder to provide an audible click as totem 36 aligns with each dot and thus detects an input. As totem 36 rotates past an input increment location, resistance to rotation is created with a haptic device that trends the totem back to its existing input value location. Once rotation of totem 36 exceeds a midpoint between input increments, the direction of resistance provided by the haptic device reverses to trend the totem towards the closest input incremental value. As an example, the haptic device is a rotating motor that contacts a rotating ball 190 exposed at the bottom surface of totem 36. The rotating motor works against the ball to rotate or move totem 36 based upon commands generated by an information handling system and sent to totem 36 with a wireless communication. Alternatively, resistance and totem rotation may be introduced by a vibrating device integrated in the totem.

Figure 27:
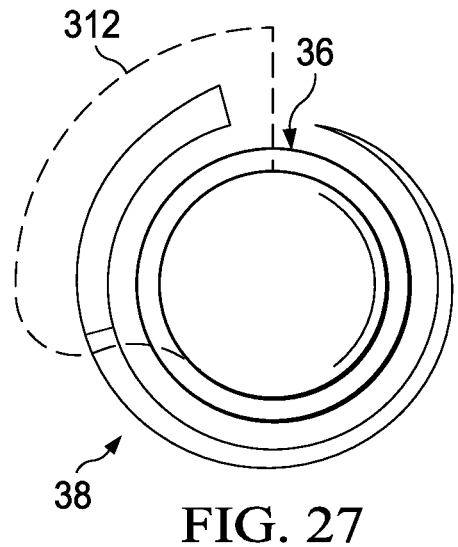
FIG. 27 depicts a top view of an alternative example embodiment for haptic interactions supported during totem movements and with a totem user interface.

Referring now to FIG. 27, a top view depicts an alternative example embodiment for haptic interactions supported during totem movements and with a totem user interface. In the example embodiment, a haptic response indicated by line 312 increases resistance to rotation of totem 36 as an input value increases towards a warning zone. Totem 36 presents the end user a bump back away from the warning zone when a maximum input value is exceeded. An information handling system interfaces with totem 36 through a wireless or other communication medium to command the haptic feedback as totem rotational position reaches defined rotational orientations.

Figure 28:
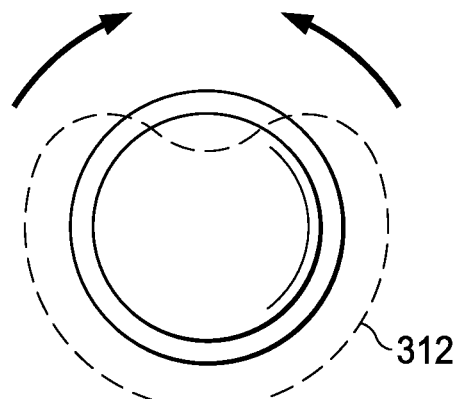
FIG. 28 depicts a top view of another alternative example embodiment for haptic interactions supported during totem movements and with a totem user interface.

Referring now to FIG. 28, a top view depicts another example embodiment for haptic interactions supported during totem movements and with a totem user interface. In the example embodiment, totem 36 snaps back to a neutral position indicated by haptic response line 312 when released by an end user hand. The end user senses an increased resistance or even totem 36 counter turning when the end user grasps totem 36. Upon release, totem 36 returns to a neutral position relative to the user interface so that the end user has a reference point from which to enter varied input values.

Figure 29:
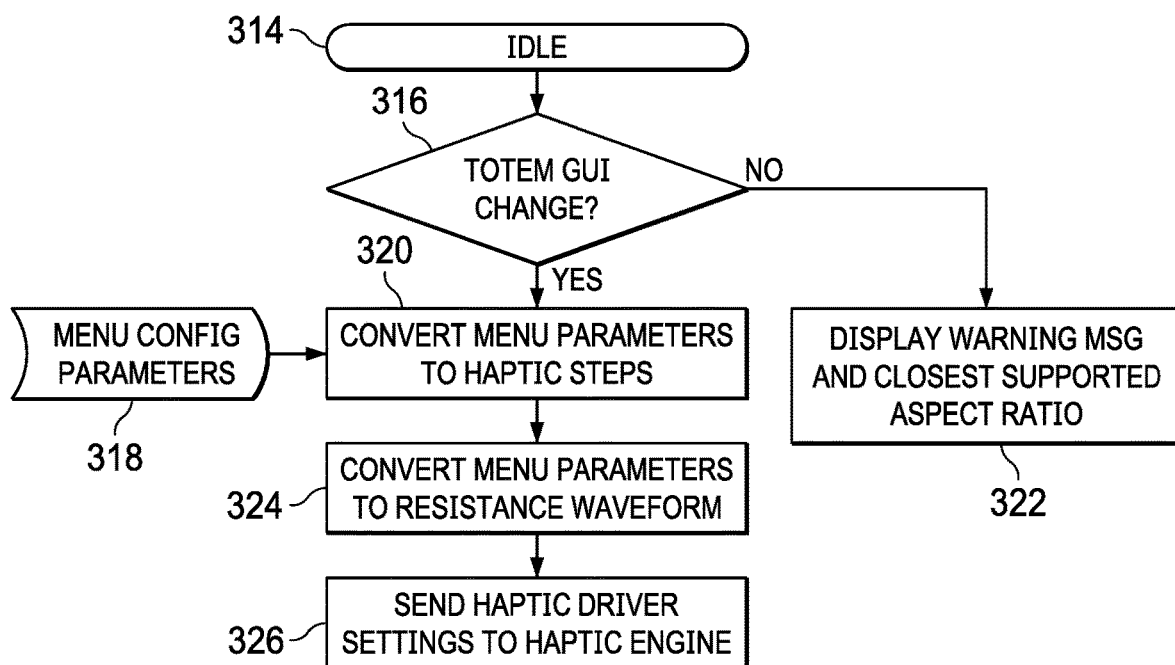
FIG. 29 depicts a flow diagram of a process for managing haptic responses at a totem device.

Referring now to FIG. 29, a flow diagram depicts a process for managing haptic responses at a totem device. The process starts at step 314 in an idle state and at step 316 determines if a totem user interface change has occurred. If not, the process ends at step 322 a display warning message and the closest available supported aspect ratio. If at step 316 a user interface change has occurred, the process continues to step 320 to convert the menu parameters to a haptic response steps. For example, haptic responses are retrieved at step 318 from a menu of configuration parameters, such as operating system or application defined parameters associated with a presented user interface. At step 324, the menu parameters are converted to a resistance waveform referenced by a haptic device in totem 36. At step 326, the haptic driver settings for the waveform are forwarded to the totem haptic engine. In one embodiment, the totem haptic driver commands a haptic response as totem positions are interpreted by the operating system and reported back to the totem. Alternatively, an optical encoder within totem 36 tracks rotational orientation and applies the haptic response based upon the configuration communicated from the operating system as the totem moves. In various embodiments, the haptic response may comprise a vibration or rotational forces that works with or against motion of the totem introduced by an end user. In one embodiment, as an end user hand leaves totem 36, haptic response may be disabled to reduce power consumption. In various alternative embodiments, other types of user interfaces may invoke haptic responses, such as linear user interfaces that have a haptic response for each incremental movement along an input line.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions to process information;
   a memory interfaced with the processor to store the instructions and information;
   a graphics processor interfaced with the processor to generate visual information from the information, the visual information configured to present visual images at a display;
   a touchscreen display interfaced with the graphics processor and operable to present the visual images;
   a touch controller interfaced with the touchscreen display, the touch controller detecting touches at the touchscreen; and
   a totem disposed on the touchscreen and touching the touchscreen with plural feet having a predetermined touch pattern, at least one of the plural feet having an active capacitance selectively applied based upon one or more predetermined conditions.

2. The information handling system of claim 1 wherein:
   the touchscreen display has a noise capacitance detection level, a finger capacitance detection level and a totem passive foot capacitance detection level of between the noise capacitance detection level and the finger capacitance detection level; and
   a totem detector interfaced with the touch controller to detect a totem based upon detection of the predetermined touch pattern from touches having a totem passive foot capacitance within the totem passive foot capacitance detection level.

3. The information handling system of claim 2 further comprising:
   a communication medium between the totem and the processor; and
   a totem capacitance manager executing on the processor and operable to receive capacitance detected by the touch controller and to communicate an active capacitance level to the totem that brings capacitance of the one or more plural feet having active capacitance to the totem passive foot capacitance detection level.

4. The information handling system of claim 1 wherein the plural feet further comprise:
   one or more feet disposed along the perimeter of the totem and associated with detection of rotation of the totem; and
   at least one foot disposed at a central location of the totem and associated with detection of linear movement of the totem.

5. The information handling system of claim 4 further comprising:
   a communication medium between the totem and the processor; and
   a totem capacitive manager executing on the processor and operable to set active capacitance of the at least one of the plural feet at least in part based upon a user interface presented as a visual image at the touchscreen display.

6. The information handling system of claim 5 wherein the visual image comprises a rotational user interface relating input values to a rotational orientation of the totem and the totem capacitive manager sets active capacitance at the one or more feet disposed along the perimeter of the totem and removes active capacitance of the at least one foot disposed at a central location of the totem.

7. The information handling system of claim 5 wherein the visual image comprises a linear user interface relating input values to a later position of the totem along the user interface and the totem capacitive manager sets active capacitance at the at least one foot disposed at a central location of the totem and removes active capacitance at the one or more feet disposed along the perimeter of the totem.

8. The information handling system of claim 5 wherein:
   the totem capacitive manager is further operable to power down all active capacitance of the at least one of the plural feet if no user interface associated with the totem is presented at the touchscreen display.

9. The information handling system of claim 1 further comprising:
   an accelerometer integrated in the totem and operable to detect motion along a vertical axis; and
   a totem controller interfaced with the accelerometer and operable to remove active capacitance at the one or more of the plural feet.

* * * * *